US011697332B2

(12) United States Patent
Bernardo

(10) Patent No.: US 11,697,332 B2
(45) Date of Patent: *Jul. 11, 2023

(54) MODIFIED RETRACTABLE TONNEAU COVER

(71) Applicant: ROLL-N-LOCK CORPORATION, Pompano Beach, FL (US)

(72) Inventor: Richard Gregory Bernardo, Pompano Beach, FL (US)

(73) Assignee: ROLL-N-LOCK CORPORATION, Pompano Beach, FL (US)

(*) Notice: Subject to any disclaimer, the term of this patent is extended or adjusted under 35 U.S.C. 154(b) by 59 days.

This patent is subject to a terminal disclaimer.

(21) Appl. No.: 17/337,308

(22) Filed: Jun. 2, 2021

(65) Prior Publication Data

US 2021/0284002 A1  Sep. 16, 2021

Related U.S. Application Data

(63) Continuation of application No. 16/587,685, filed on Sep. 30, 2019, now Pat. No. 11,040,605, which is a continuation of application No. 15/796,123, filed on Oct. 27, 2017, now Pat. No. 10,457,124.

(60) Provisional application No. 62/576,497, filed on Oct. 24, 2017, provisional application No. 62/547,574, filed on Aug. 18, 2017.

(51) Int. Cl.
*B60J 7/08* (2006.01)
*B60J 7/16* (2006.01)
*B60J 7/06* (2006.01)

(52) U.S. Cl.
CPC .............. *B60J 7/085* (2013.01); *B60J 7/068* (2013.01); *B60J 7/1607* (2013.01)

(58) Field of Classification Search
CPC .......... B60J 7/085; B60J 7/068; B60J 7/1607
USPC ..................................... 296/100.05
See application file for complete search history.

(56) References Cited

U.S. PATENT DOCUMENTS

| 171,736 A | 1/1876 | Mooney |
| 309,767 A | 12/1884 | Clarke |
| 341,307 A | 5/1886 | Altschwager |
| 540,707 A | 6/1895 | Wolf |
| 600,898 A | 3/1898 | Smith |
| 1,127,854 A | 2/1915 | Belankski |

(Continued)

FOREIGN PATENT DOCUMENTS

| CN | 108791034 | 11/2018 |
| CN | 109230011 | 1/2019 |

(Continued)

OTHER PUBLICATIONS

Features Comparison. Roll-N-Lock E-Series vs. Pace Edwards Bedlocker. http://rollnlock.com/wp-content/uploads/2013/07/FeatureComparison_E-Series_Eng1.pdf.

(Continued)

*Primary Examiner* — Joseph D. Pape
*Assistant Examiner* — Dana D Ivey
(74) *Attorney, Agent, or Firm* — William H. Honaker; Dickinson Wright PLLC

(57) ABSTRACT

Disclosed are embodiments of a retractable tonneau cover for a vehicle that has been modified in order to generally minimize the size of a housing of the tonneau cover, providing more vehicle cargo space for a user. The modified retractable tonneau cover can be automatically closed through an electronic system.

20 Claims, 14 Drawing Sheets

(56) References Cited

U.S. PATENT DOCUMENTS

| | | |
|---|---|---|
| 1,214,600 A | 2/1917 | Silverthorne |
| 1,242,035 A | 10/1917 | Pierson et al. |
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,655,797 A | 1/1928 | Peck |
| 1,764,615 A | 6/1930 | Edwards |
| 1,812,580 A | 6/1931 | Black |
| 1,930,841 A | 10/1933 | Miniere |
| 2,067,994 A | 1/1937 | Thwaits |
| 2,483,947 A | 10/1949 | Turner |
| 2,514,466 A | 7/1950 | Bildhauer |
| D160,213 S | 9/1950 | Samuelson |
| 2,530,365 A | 11/1950 | Johnson et al. |
| 2,621,357 A | 12/1952 | Stuman |
| 2,626,179 A | 1/1953 | Gonzalez |
| 2,663,447 A | 12/1953 | Westcott |
| RE23,814 E | 4/1954 | Ingram |
| 2,713,897 A | 7/1955 | Teague et al. |
| 2,720,414 A | 10/1955 | Hart |
| 2,795,363 A | 6/1957 | Turner |
| 2,795,383 A | 6/1957 | Turner |
| 2,797,959 A | 7/1957 | Brice |
| 2,872,239 A | 2/1959 | Bowness et al. |
| 2,874,885 A | 2/1959 | Young |
| 3,148,724 A | 9/1964 | Chieger et al. |
| 3,329,385 A | 7/1967 | Dietsch |
| 3,357,670 A | 12/1967 | Larson et al. |
| 3,656,801 A | 4/1972 | Doutt et al. |
| 3,675,959 A | 7/1972 | Hansen et al. |
| 3,734,560 A | 5/1973 | Cramblet |
| 3,773,143 A | 11/1973 | Del Prete et al. |
| 3,902,599 A | 9/1975 | Stromberg |
| 4,023,850 A | 5/1977 | Tillery |
| 4,063,774 A | 12/1977 | Hanks |
| 4,132,335 A | 1/1979 | Ingram |
| 4,136,905 A | 1/1979 | Morgan |
| 4,145,044 A | 3/1979 | Wilson et al. |
| 4,270,681 A | 6/1981 | Ingram |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,592,529 A | 6/1986 | Suzuki |
| 4,596,174 A | 6/1986 | Bennett |
| 4,596,417 A | 6/1986 | Bennett |
| 4,635,992 A | 1/1987 | Hamilton |
| 4,650,144 A | 3/1987 | ConraD |
| 4,652,035 A | 3/1987 | Austin, Jr. |
| 4,659,136 A | 4/1987 | Martin et al. |
| D291,789 S | 9/1987 | Noga |
| D294,137 S | 2/1988 | Robson |
| 4,749,226 A | 6/1988 | Heft |
| 4,750,773 A | 6/1988 | Chapline |
| 4,770,458 A | 9/1988 | Burke et al. |
| 4,778,213 A | 10/1988 | Palmer |
| 4,786,099 A | 11/1988 | Mount |
| 4,786,119 A | 11/1988 | Smuda |
| 4,793,397 A | 12/1988 | Whiteman |
| 4,795,206 A | 1/1989 | Adams et al. |
| D300,734 S | 4/1989 | Kruitbosch |
| 4,824,158 A | 4/1989 | Peters et al. |
| 4,828,312 A | 5/1989 | Kinkel |
| 4,830,242 A | 5/1989 | Painter |
| 4,850,770 A | 7/1989 | Millar, Jr. |
| 4,860,495 A | 8/1989 | Kessler |
| 4,875,724 A | 10/1989 | Gruber |
| D305,111 S | 12/1989 | Zagner |
| 4,884,317 A | 12/1989 | Liu |
| D308,627 S | 6/1990 | Guffey |
| 4,953,820 A | 9/1990 | Yoder |
| 4,961,677 A | 10/1990 | Downard, Jr. |
| 5,005,892 A | 4/1991 | Haugen et al. |
| 5,011,349 A | 4/1991 | McAndrews |
| 5,024,409 A | 6/1991 | Bohnen |
| 5,037,152 A | 8/1991 | Hendricks |
| 5,037,153 A | 8/1991 | Stark |
| 5,040,843 A | 8/1991 | Russell et al. |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,121,960 A | 6/1992 | Wheatley |
| 5,123,691 A | 6/1992 | Ginn |
| 5,127,697 A | 7/1992 | St. Marie |
| 5,129,665 A | 7/1992 | Sutter et al. |
| 5,147,103 A | 9/1992 | Ducote |
| 5,154,470 A | 10/1992 | Bringman, Jr. |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| D337,934 S | 8/1993 | Young |
| 5,234,122 A | 8/1993 | Cherng |
| 5,251,950 A | 10/1993 | Bernardo |
| 5,253,913 A | 10/1993 | Metivier |
| 5,275,458 A | 1/1994 | Barben et al. |
| 5,299,773 A | 4/1994 | Bertrand |
| 5,301,913 A | 4/1994 | Wheatley |
| 5,310,155 A | 5/1994 | Wu |
| 5,310,238 A | 5/1994 | Wheatley |
| 5,330,246 A | 7/1994 | Bernardo |
| 5,357,376 A | 10/1994 | Yoshida |
| 5,380,141 A | 1/1995 | Flowers |
| 5,385,377 A | 1/1995 | Girard |
| 5,396,915 A | 3/1995 | Bomar |
| 5,417,340 A | 5/1995 | Anthony |
| 5,421,633 A | 5/1995 | Moore et al. |
| D360,614 S | 7/1995 | Alcocer |
| 5,441,324 A | 8/1995 | Gold |
| 5,443,341 A | 8/1995 | Hamilton |
| 5,456,511 A | 10/1995 | Webber |
| 5,460,393 A | 10/1995 | Tsai |
| 5,460,423 A | 10/1995 | Kersting et al. |
| 5,468,038 A | 11/1995 | Sauri |
| D365,323 S | 12/1995 | Napierkowski et al. |
| 5,487,585 A | 1/1996 | Wheatley |
| 5,500,983 A | 3/1996 | Lautenschlager |
| 5,522,635 A | 6/1996 | Downey |
| 5,540,475 A | 7/1996 | Kersting |
| 5,573,161 A | 11/1996 | Stapleton |
| 5,579,970 A | 12/1996 | Cucheran et al. |
| 5,588,630 A | 12/1996 | Chen-Chao |
| 5,622,296 A | 4/1997 | Pirhonen et al. |
| 5,636,893 A | 6/1997 | Wheatley et al. |
| 5,655,808 A | 8/1997 | Wheatley |
| 5,658,033 A | 8/1997 | Delaune |
| 5,673,958 A | 10/1997 | Gramss |
| 5,685,686 A | 11/1997 | Burns |
| 5,700,047 A | 12/1997 | Leitner et al. |
| 5,730,342 A | 3/1998 | Tien |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |
| 5,775,759 A | 7/1998 | Cummings |
| 5,782,282 A | 7/1998 | Chen |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,816,637 A | 10/1998 | Adams et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |

(56) References Cited

U.S. PATENT DOCUMENTS

| | | |
|---|---|---|
| 5,857,724 A | 1/1999 | Jarman |
| 5,857,729 A | 1/1999 | Bogard |
| 5,862,964 A | 1/1999 | Moliner |
| 5,873,688 A | 2/1999 | Wheatley |
| 5,893,500 A | 4/1999 | Cucheran et al. |
| D410,429 S | 6/1999 | Derecktor |
| 5,911,464 A | 6/1999 | White |
| 5,913,465 A | 6/1999 | Potter et al. |
| 5,924,614 A | 7/1999 | Kuntze et al. |
| 5,924,753 A | 7/1999 | DiBassie |
| 5,975,618 A | 11/1999 | Rippberger |
| 5,984,379 A | 11/1999 | Michel et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,024,401 A | 2/2000 | Wheatley et al. |
| 6,024,402 A | 2/2000 | Wheatley |
| 6,039,520 A | 3/2000 | Cheng |
| 6,053,557 A | 4/2000 | Kooiker |
| 6,053,558 A | 4/2000 | Weldy et al. |
| 6,059,159 A | 5/2000 | Fisher |
| 6,076,881 A | 6/2000 | Tucker |
| 6,082,801 A | 7/2000 | Owen et al. |
| 6,092,263 A | 7/2000 | Boue et al. |
| 6,102,265 A | 8/2000 | Stapleton |
| 6,112,964 A | 9/2000 | Cucheran et al. |
| 6,112,965 A | 9/2000 | Lundgren |
| 6,113,173 A | 9/2000 | Leitner et al. |
| 6,113,176 A | 9/2000 | Bernardo |
| 6,113,328 A | 9/2000 | Claucherty |
| 6,120,076 A | 9/2000 | Adsit et al. |
| 6,123,305 A | 9/2000 | LukasavitZ |
| 6,129,490 A | 10/2000 | Erskine et al. |
| 6,149,219 A | 11/2000 | Schambre et al. |
| 6,149,220 A | 11/2000 | Weldy et al. |
| 6,227,593 B1 | 5/2001 | De Valcourt |
| 6,227,602 B1 | 5/2001 | Bogard |
| 6,256,844 B1 | 7/2001 | Wheatley |
| 6,257,637 B1 | 7/2001 | Reed |
| 6,264,266 B1 | 7/2001 | Rusu et al. |
| 6,269,990 B1 | 8/2001 | Gray |
| 6,273,491 B1 | 8/2001 | Bath et al. |
| 6,276,735 B1 | 8/2001 | Champion |
| 6,283,525 B1 | 9/2001 | Morse |
| 6,338,515 B1 | 1/2002 | Munhall |
| 6,340,190 B1 | 1/2002 | Rosebrugh et al. |
| 6,340,194 B1 | 1/2002 | Muirhead et al. |
| 6,350,089 B1 | 2/2002 | Tekavec |
| 6,352,295 B1 | 3/2002 | Leitner |
| 6,378,926 B1 | 4/2002 | Renze et al. |
| 6,390,427 B1 | 5/2002 | McConnell et al. |
| 6,402,215 B1 | 6/2002 | Leitner et al. |
| 6,422,627 B1 | 7/2002 | Kuhn et al. |
| 6,425,618 B1 | 7/2002 | Garland et al. |
| 6,454,338 B1 | 9/2002 | Glickman et al. |
| 6,471,277 B1 | 10/2002 | Scensny et al. |
| 6,488,249 B1 | 12/2002 | Girardi et al. |
| 6,494,520 B2 | 12/2002 | Brzenchek et al. |
| 6,499,791 B2 | 12/2002 | Wheatley |
| 6,513,688 B2 | 2/2003 | Kmita et al. |
| 6,540,123 B1 | 4/2003 | Kmita et al. |
| 6,543,836 B1 | 4/2003 | Wheatley |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,568,740 B1 | 5/2003 | Dimmer |
| 6,575,520 B1 | 6/2003 | Spencer |
| 6,585,465 B1 | 7/2003 | Hammond et al. |
| 6,598,922 B2 | 7/2003 | Morse et al. |
| 6,604,898 B2 | 8/2003 | Price |
| 6,607,228 B2 | 8/2003 | Carter, III et al. |
| 6,626,478 B1 | 9/2003 | Minton |
| 6,637,707 B1 | 10/2003 | Gates et al. |
| D485,800 S | 1/2004 | Smith et al. |
| 6,676,182 B2 | 1/2004 | Fitts |
| 6,719,261 B2 | 4/2004 | Wadsworth |
| 6,719,345 B2 | 4/2004 | Ootsuka et al. |
| 6,722,541 B1 | 4/2004 | Aftanas et al. |
| 6,742,973 B1 | 6/2004 | Hendrix et al. |
| 6,752,449 B1 | 6/2004 | Wheatley |
| 6,752,575 B1 | 6/2004 | Moore et al. |
| 6,789,832 B2 | 9/2004 | Gort et al. |
| 6,796,471 B2 | 9/2004 | Aftanas et al. |
| 6,805,392 B2 | 10/2004 | Leitner et al. |
| 6,811,203 B2 | 11/2004 | Wheatley |
| 6,814,389 B2 | 11/2004 | Wheatley |
| 6,824,191 B2 | 11/2004 | Wheatley |
| 6,843,394 B2 | 1/2005 | Aki |
| D501,443 S | 2/2005 | Jones et al. |
| D504,384 S | 4/2005 | StrascheWski |
| 6,874,747 B2 | 4/2005 | Oh |
| 6,889,878 B2 | 5/2005 | Parsons |
| 6,893,073 B2 | 5/2005 | Wheatley |
| 6,913,175 B2 | 7/2005 | Martin |
| 6,918,624 B2 | 7/2005 | Miller et al. |
| 6,923,488 B2 | 8/2005 | Bruford et al. |
| 6,942,225 B2 | 9/2005 | Gentemann et al. |
| 6,948,763 B2 | 9/2005 | Robbins |
| 6,966,595 B2 | 11/2005 | Bruford et al. |
| 6,976,724 B2 | 12/2005 | Wheatley |
| 6,983,972 B2 | 1/2006 | Tan et al. |
| 6,994,389 B1 | 2/2006 | Graffy et al. |
| 6,997,657 B1 | 2/2006 | Saward |
| 7,007,995 B1 | 3/2006 | Scarberry et al. |
| 7,025,403 B2 | 4/2006 | Wheatley |
| 7,040,849 B2 | 5/2006 | Cunningham et al. |
| 7,063,366 B2 | 6/2006 | Leitner et al. |
| 7,093,870 B2 | 8/2006 | Kim et al. |
| 7,100,956 B1 | 9/2006 | Wilkins |
| 7,111,886 B1 | 9/2006 | Miller et al. |
| 7,121,604 B2 | 10/2006 | Reed |
| 7,152,902 B2 | 12/2006 | Moen et al. |
| 7,159,918 B2 | 1/2007 | Lussier |
| 7,175,218 B1 | 2/2007 | Keene |
| 7,175,377 B2 | 2/2007 | Womack et al. |
| 7,182,380 B2 | 2/2007 | Nagle |
| 7,188,888 B2 | 3/2007 | Wheatley et al. |
| 7,195,432 B2 | 3/2007 | Earle et al. |
| 7,204,540 B2 | 4/2007 | Wheatley |
| D544,826 S | 6/2007 | Smith |
| 7,226,100 B1 | 6/2007 | Willey et al. |
| 7,229,116 B1 | 6/2007 | Bruford et al. |
| 7,240,940 B2 | 7/2007 | Leitner |
| 7,252,322 B2 | 8/2007 | Rusu |
| 7,258,387 B2 | 8/2007 | Weldy |
| 7,267,387 B1 | 9/2007 | Bruford et al. |
| D553,072 S | 10/2007 | Smith |
| 7,287,943 B1 | 10/2007 | SaWard |
| 7,303,222 B2 | 12/2007 | Wilkins |
| 7,322,633 B2 | 1/2008 | Zajicek et al. |
| 7,334,830 B2 | 2/2008 | Weldy |
| 7,347,473 B2 | 3/2008 | Miller et al. |
| D568,230 S | 5/2008 | Smith |
| 7,384,090 B1 | 6/2008 | Weldy |
| 7,393,035 B2 | 7/2008 | Leitner et al. |
| 7,413,231 B1 | 8/2008 | Wood et al. |
| 7,427,095 B2 | 9/2008 | Wheatley |
| 7,445,264 B2 | 11/2008 | Spencer et al. |
| 7,464,976 B2 | 12/2008 | Smith |
| 7,484,790 B2 | 2/2009 | Wheatley |
| 7,488,021 B1 | 2/2009 | Roos et al. |
| 7,497,493 B1 | 3/2009 | Thiessen et al. |
| 7,506,917 B2 | 3/2009 | Essig |
| 7,513,543 B2 | 4/2009 | Erskine |
| 7,537,264 B2 | 5/2009 | Maimin et al. |
| 7,547,054 B2 | 6/2009 | Leitner |
| 7,549,828 B2 | 6/2009 | Smith |
| D597,924 S | 8/2009 | Smith |
| 7,604,282 B2 | 10/2009 | Spencer et al. |
| 7,607,714 B2 | 10/2009 | Wheatley et al. |
| 7,628,442 B1 | 12/2009 | Spencer et al. |
| 7,654,598 B2 | 2/2010 | Leitner et al. |
| 7,654,599 B2 | 2/2010 | Stewart et al. |

(56) References Cited

U.S. PATENT DOCUMENTS

| | | |
|---|---|---|
| 7,681,935 B2 | 3/2010 | Leitner et al. |
| D627,703 S | 11/2010 | McLaughlin |
| 7,823,957 B2 | 11/2010 | Williamson |
| 7,841,638 B2 | 11/2010 | Smith |
| 7,845,887 B2 | 12/2010 | Smith |
| 7,857,371 B2 | 12/2010 | Leitner |
| 7,878,568 B2 | 2/2011 | Wu |
| 7,900,990 B2 | 3/2011 | Townson |
| 7,905,536 B2 | 3/2011 | Yue |
| 7,905,539 B2 | 3/2011 | De Carli |
| 7,959,203 B2 | 6/2011 | Smith |
| 8,020,737 B2 | 9/2011 | Sweeney |
| 8,020,912 B2 | 9/2011 | Lounds |
| 8,146,982 B2 | 4/2012 | Williamson et al. |
| 8,262,148 B2 | 9/2012 | Rusher et al. |
| 8,297,677 B2 | 10/2012 | Leitner et al. |
| 8,336,946 B2 | 12/2012 | Schrader et al. |
| 8,366,173 B2 | 2/2013 | Xu |
| 8,474,896 B2 | 7/2013 | Ostberg |
| 8,480,154 B2 | 7/2013 | Yue |
| 8,511,736 B2 | 8/2013 | Williamson et al. |
| 8,672,388 B2 | 3/2014 | Rusher |
| 8,678,459 B1 | 3/2014 | Win |
| 8,727,415 B2 | 5/2014 | Smith |
| 8,807,625 B2 | 8/2014 | Garska |
| 9,266,416 B1 | 2/2016 | Nania |
| 9,346,344 B2 | 5/2016 | Smith et al. |
| 9,352,790 B2 | 5/2016 | Smith |
| 9,487,071 B1 | 11/2016 | Yue |
| 9,827,838 B2 | 11/2017 | Hannan et al. |
| 9,827,839 B2 | 11/2017 | Williamson et al. |
| 9,834,076 B2 | 12/2017 | Rohr et al. |
| 9,834,259 B2 | 12/2017 | Smith |
| 9,840,135 B2 | 12/2017 | Rusher et al. |
| 9,840,136 B2 | 12/2017 | Smith et al. |
| 10,081,235 B2 | 9/2018 | Freitas et al. |
| 10,086,746 B2 | 10/2018 | Loew et al. |
| 10,093,159 B1 | 10/2018 | Zichettello et al. |
| 10,094,159 B2 | 10/2018 | Grudzinski et al. |
| 10,099,544 B2 | 10/2018 | Battiato |
| 10,106,022 B2 | 10/2018 | Xu |
| 10,106,089 B2 | 10/2018 | Herman |
| 10,112,465 B2 | 10/2018 | Flocco |
| 10,137,766 B2 | 11/2018 | Bernardo et al. |
| 10,144,276 B2 | 12/2018 | Facchinello et al. |
| 10,166,849 B2 | 1/2019 | Facchinello et al. |
| 10,232,691 B1 | 3/2019 | Weng et al. |
| 10,308,101 B2 | 6/2019 | Kim et al. |
| 10,328,778 B2 | 6/2019 | Aubrey et al. |
| 10,399,421 B2 | 9/2019 | Smith et al. |
| 10,457,124 B2 * | 10/2019 | Bernardo ............... B60J 7/1607 |
| 10,647,187 B2 | 5/2020 | Slinger et al. |
| 10,800,231 B2 | 10/2020 | Bernardo et al. |
| 10,919,369 B2 | 2/2021 | Lewis et al. |
| 2001/0005960 A1 | 7/2001 | Yamaguchi et al. |
| 2002/0000732 A1 | 1/2002 | Sanders |
| 2002/0096268 A1 | 7/2002 | Schmeichel et al. |
| 2002/0180235 A1 | 12/2002 | Wheatley |
| 2003/0057726 A1 | 3/2003 | Wheatley |
| 2004/0080174 A1 | 4/2004 | Buelna |
| 2004/0124658 A1 | 7/2004 | Wheatley |
| 2004/0134953 A1 | 7/2004 | Perez |
| 2005/0077747 A1 | 4/2005 | De Gaillard et al. |
| 2006/0091170 A1 | 5/2006 | Almhil |
| 2006/0091171 A1 | 5/2006 | Wardell et al. |
| 2006/0208524 A1 | 9/2006 | Brown et al. |
| 2006/0263163 A1 | 11/2006 | Harberts et al. |
| 2006/0267370 A1 | 11/2006 | Wheatley et al. |
| 2006/0283900 A1 | 12/2006 | Stapleton |
| 2007/0063529 A1 | 3/2007 | Weldy |
| 2007/0108792 A1 | 5/2007 | Weldy |
| 2007/0170739 A1 | 7/2007 | Sims |
| 2007/0262602 A1 | 11/2007 | Nagle |
| 2008/0101883 A1 | 5/2008 | Derecktor |
| 2008/0106114 A1 | 5/2008 | Wheatley |
| 2008/0129077 A1 | 6/2008 | Weldy |
| 2008/0179911 A1 | 7/2008 | Spencer et al. |
| 2009/0020576 A1 | 1/2009 | Gale |
| 2009/0146449 A1 | 6/2009 | Steffens et al. |
| 2010/0270824 A1 | 10/2010 | Yue |
| 2010/0283280 A1 | 11/2010 | Kohlstrand et al. |
| 2011/0175387 A1 | 7/2011 | Smith |
| 2012/0274091 A1 | 11/2012 | Yue |
| 2012/0274092 A1 | 11/2012 | Yue |
| 2012/0274093 A1 | 11/2012 | Yue |
| 2012/0319423 A1 | 12/2012 | Smith |
| 2013/0119693 A1 | 5/2013 | Leitner et al. |
| 2013/0341960 A1 | 12/2013 | Garska |
| 2015/0001877 A1 | 1/2015 | Fink |
| 2015/0054300 A1 | 2/2015 | Shi et al. |
| 2015/0061315 A1 | 3/2015 | Facchinello et al. |
| 2015/0102077 A1 | 4/2015 | Martin |
| 2016/0039274 A1 | 2/2016 | Smith et al. |
| 2016/0263974 A1 | 9/2016 | Xu |
| 2016/0355078 A1 | 12/2016 | Williamson et al. |
| 2017/0066311 A1 | 3/2017 | Facchinello et al. |
| 2017/0144520 A1 | 5/2017 | Hemphill et al. |
| 2017/0197498 A1 | 7/2017 | Facchinello et al. |
| 2017/0326956 A1 | 11/2017 | Marshall |
| 2017/0341494 A1 | 11/2017 | Hannan et al. |
| 2017/0349081 A1 | 12/2017 | Yilma et al. |
| 2017/0355251 A1 | 12/2017 | Rossi |
| 2017/0361755 A1 | 12/2017 | Yilma et al. |
| 2018/0134132 A1 * | 5/2018 | Nania ............... B60P 7/04 |
| 2018/0147925 A1 | 5/2018 | Williamson et al. |
| 2018/0272930 A1 | 9/2018 | Dylewski et al. |
| 2018/0281572 A1 | 10/2018 | Zichettello et al. |
| 2018/0281573 A1 | 10/2018 | Zichettello et al. |
| 2018/0281574 A1 | 10/2018 | Zichettello et al. |
| 2018/0281575 A1 | 10/2018 | Singer |
| 2018/0281576 A1 | 10/2018 | Zichettello et al. |
| 2018/0290527 A1 | 10/2018 | Marchlewski et al. |
| 2018/0290529 A1 | 10/2018 | Ching |
| 2018/0297456 A1 | 10/2018 | Stickles et al. |
| 2018/0339578 A1 | 11/2018 | Sullivan |
| 2018/0339581 A1 | 11/2018 | Rossi et al. |
| 2018/0339658 A1 | 11/2018 | Frederick et al. |
| 2018/0345768 A1 | 12/2018 | Frederick et al. |
| 2018/0345769 A1 | 12/2018 | Dylewski et al. |
| 2019/0100087 A1 | 4/2019 | Facchinello et al. |
| 2019/0118629 A1 | 4/2019 | Spencer |
| 2019/0168590 A1 | 6/2019 | O'Reilly |
| 2019/0291553 A1 | 9/2019 | Ma |
| 2020/0016642 A1 | 1/2020 | Kraft et al. |
| 2020/0056639 A1 | 2/2020 | Voegele et al. |
| 2020/0094660 A1 | 3/2020 | Ma |
| 2020/0101823 A1 | 4/2020 | Bernardo |
| 2020/0108702 A1 | 4/2020 | Dylweski, II et al. |
| 2020/0130483 A1 | 4/2020 | Vickery |
| 2020/0148046 A1 | 5/2020 | Ma |
| 2020/0164732 A1 | 5/2020 | Smith |
| 2020/0331330 A1 | 10/2020 | Slinger et al. |
| 2021/0129919 A1 | 5/2021 | Smith |

FOREIGN PATENT DOCUMENTS

| | | |
|---|---|---|
| CN | 106564417 | 5/2019 |
| DE | 2729235 | 1/1979 |
| FR | 2781249 | 1/2000 |
| WO | WO 1994/001298 | 1/1994 |
| WO | WO 2016/022164 | 2/2016 |

OTHER PUBLICATIONS

Roll-N-Lock 2015 Catalog for M-Series and A-series retractable truck bed covers.http://rollnlock.com/wp-content/uploads/2015/03/RNL_Catalog_2015_WEB.pdf.

* cited by examiner

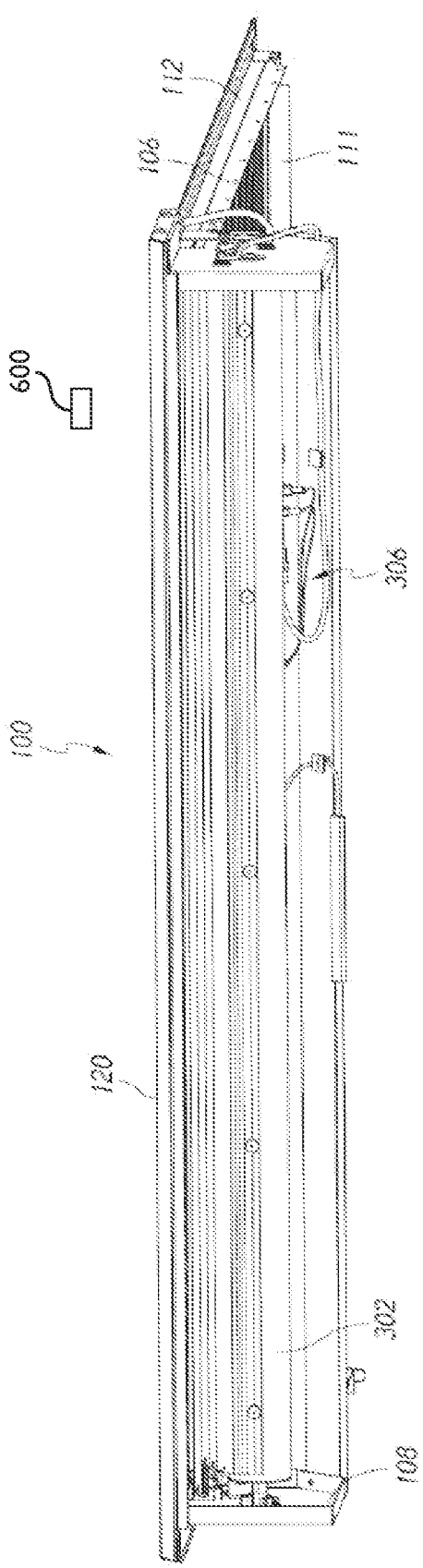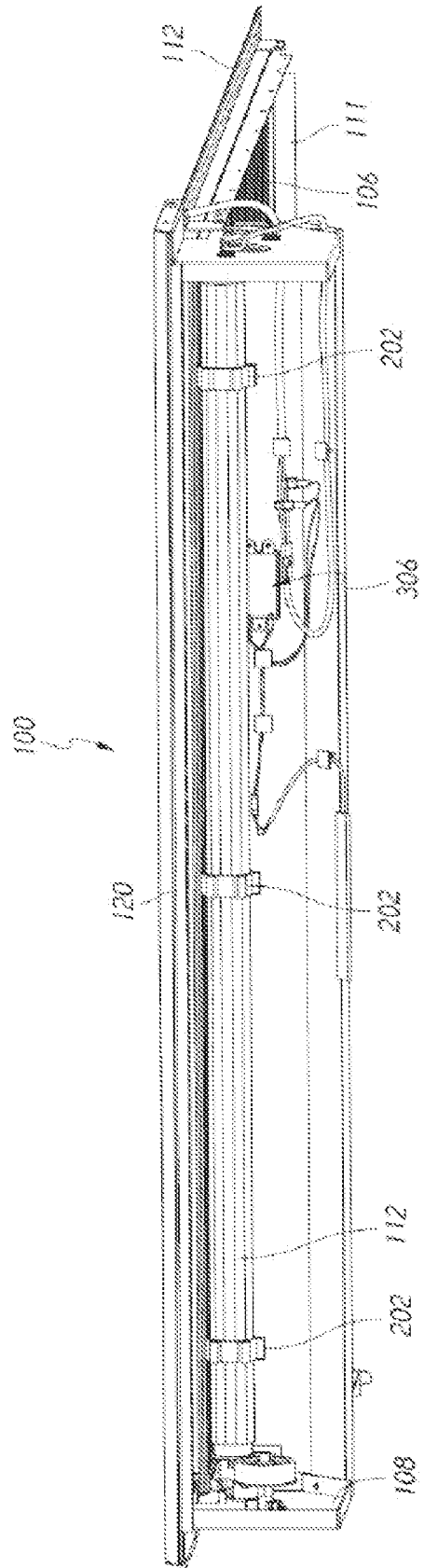
FIG. 7A
FIG. 7B

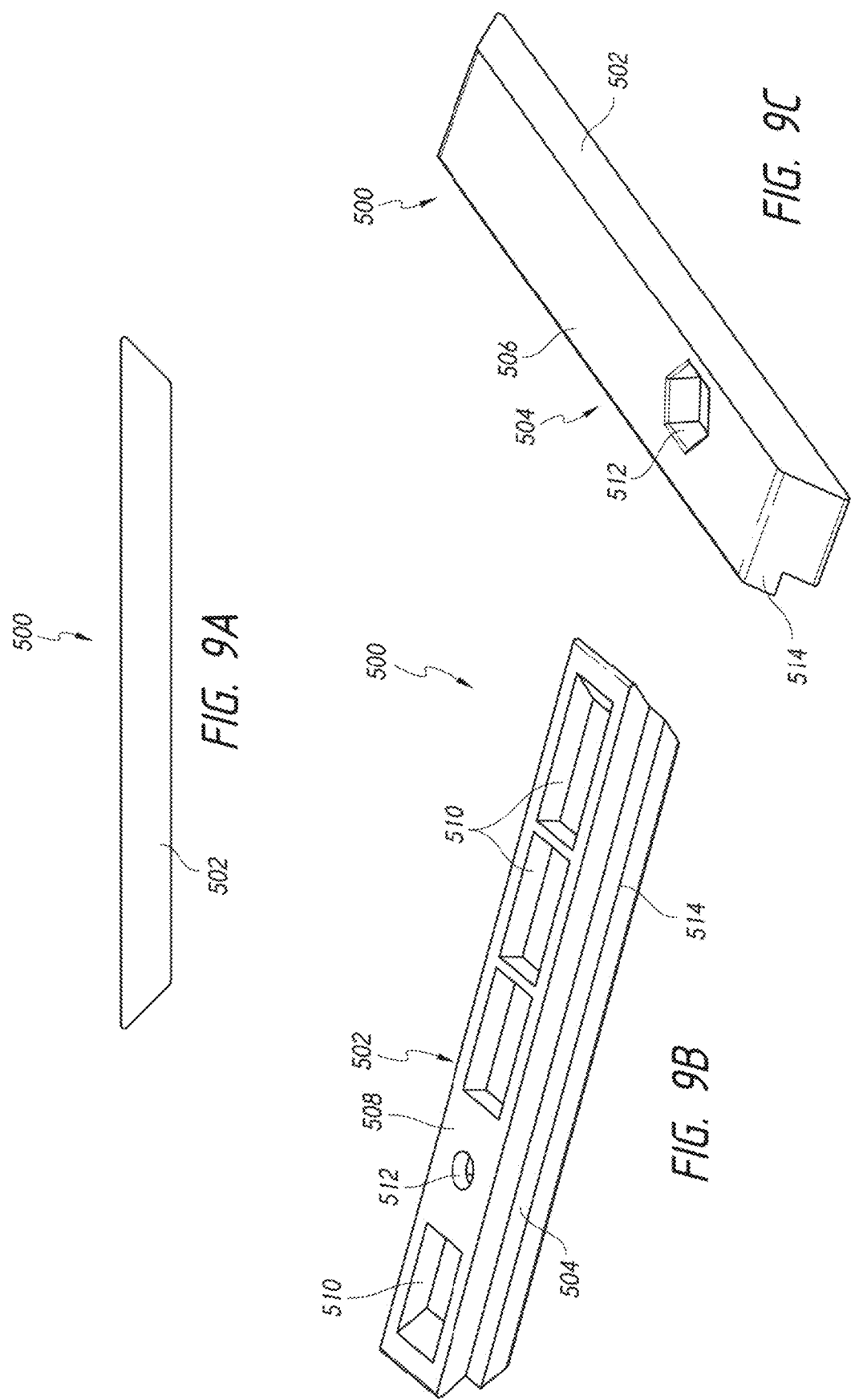

MODIFIED RETRACTABLE TONNEAU COVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to retractable vehicle tonneau covers.

Description of the Related Art

Hard tonneau covers have previously been used to cover certain portions of vehicles, such as cargo beds for trucks. However, typical hard tonneau covers can take up substantial space in the truck cargo bed, thus reducing the amount of available space that can be used in the cargo truck bed. Further, these hard tonneau covers can occasionally become separated from the motor, thus requiring substantial repair.

SUMMARY

Disclosed herein are embodiments of a retractable tonneau cover comprising a pair of side rails, a plurality of connected slats extending between the side rails, a toothed cog configured to mate with the plurality of connected slats in order to retract and extend the plurality of connected slats along the pair of side rails, a motor configured to rotate the toothed cog, and a housing to contain the toothed cog and the plurality of connected slats in a retracted position.

Disclosed herein are embodiments of a retractable tonneau cover comprising a pair of side rails, a plurality of connected slats extending between the side rails, a circular drive cog configured to mate with the plurality of connected slats in order to retract and/or extend the plurality of connected slats along the pair of side rails between an extended position and a retracted position, the circular drive cog configured to mate with a motor drive reel on an inner surface, and the circular drive cog having a diameter of approximately 2 inches or less, a motor within the motor drive reel and configured to rotate the circular drive cog, a spring connected to an end of the plurality of connected slats and configured to provide tension onto the plurality of connected slats, and a housing configured to contain the circular drive cog, the motor, the spring, and at least a portion of the plurality of connected slats in the retracted position.

In some embodiments, the motor can be configured to be operated by a key fob. In some embodiments, the tonneau cover can further comprise an emergency stop, the emergency stop configured to disengage the motor from the motor drive reel. In some embodiments, the spring can be a torsion spring. In some embodiments, the retractable tonneau cover can be a hard tonneau cover. In some embodiments, each of the plurality of connected slats can be an aluminum slat. In some embodiments, the plurality of connected slats can be not covered. In some embodiments, the plurality of connected slats can be configured to retract into the housing without the motor operating. In some embodiments, the motor can be a tubular motor.

In some embodiments, the retractable tonneau cover can comprise a stopper on a tailgate end of the retractable tonneau cover, the stopper configured to abut the housing in the retracted position. In some embodiments, the retractable tonneau cover can further comprise an engagement pad attached to at least one of the pair of side rails, the engagement pad configured to provide a downward force onto an upward facing surface of the plurality of connected slats. In some embodiments, the plurality of connected slats can wrap around the spring during retraction.

Also disclosed herein are embodiments of a retractable tonneau cover comprising a pair of side rails, a plurality of connected slats extending between the side rails, the plurality of connected slats having an upward facing surface and a downward facing surface, a circular drive cog configured to mate with the plurality of connected slats in order to retract and/or extend the plurality of connected slats along the pair of side rails and configured to mate with a motor drive reel on an inner surface, the circular drive cog providing an upward force on the downward facing surface of the plurality of connected slats, an engagement pad attached to at least one of the pair of side rails, the engagement pad configured to provide a downward force onto the upward facing surface of the plurality of connected slats in order to oppose the upward force, a motor within the motor drive reel and configured to rotate the circular drive cog, and a spring connected to the plurality of connected slats and configured to provide tension onto the plurality of connected slats.

In some embodiments, the engagement pad can be plastic. In some embodiments, the tonneau cover can further comprise a pair of circular drive cogs and a pair of engagement pads. In some embodiments, the engagement pad has a width of less than ½ of the width of one of the pair of side rails. In some embodiments, the engagement pad has a width of less than ¼ of the width of one of the pair of side rails.

Also disclosed herein are embodiments of a retractable tonneau cover comprising a pair of side rails, a plurality of connected metallic slats extending between the side rails, the plurality of connected metallic slats not covered by vinyl, a circular drive cog configured to mate with the plurality of connected slats in order to retract and/or extend the plurality of connected slats along the pair of side rails between an extended position and a retracted position, the circular drive cog configured to mate with a motor drive reel on an inner surface, and a motor within the motor drive reel, the motor configured to rotate the circular drive cog.

In some embodiments, the plurality of connected metallic slats can be aluminum.

BRIEF DESCRIPTION OF THE DRAWINGS

FIGS. 7A-B illustrates a rear view of a retractable tonneau cover.

FIGS. 9A-C illustrates views of an engagement pad that can be used with the retractable tonneau cover.

DETAILED DESCRIPTION

Disclosed herein are embodiments of retractable tonneau covers which can be operated, e.g., opened and/or closed, by a motor. Embodiments of the disclosed tonneau cover can include a smaller and lower profile lid, which can reduce the housing assembly size, thereby conserving truck bed space and providing an enhanced aesthetic appearance. Further, embodiments of the disclosure can lead to a simplification of the assembly process for the tonneau cover. Certain components of the tonneau cover have been modified as well, as discussed in detail below.

In some embodiments, the retractable tonneau cover can be automatically opened and/or closed by a motor, thus not requiring any manual pulling of the tonneau cover by a user. Previous tonneau covers may include a strap for manually opening the tonneau cover. Embodiments of the disclosure can still include such a strap in case there are any problems with the motor, though it may not be included in certain embodiments.

Additionally, while the following disclosure contains particularities to a hard tonneau cover, the disclosure is not so limited and can be used with a retractable soft tonneau cover as well.

In some embodiments, the tonneau cover can include a light on an underside surface so a user can see into the cargo bed even if the tonneau cover is partially or fully closed.

Figure 1A:
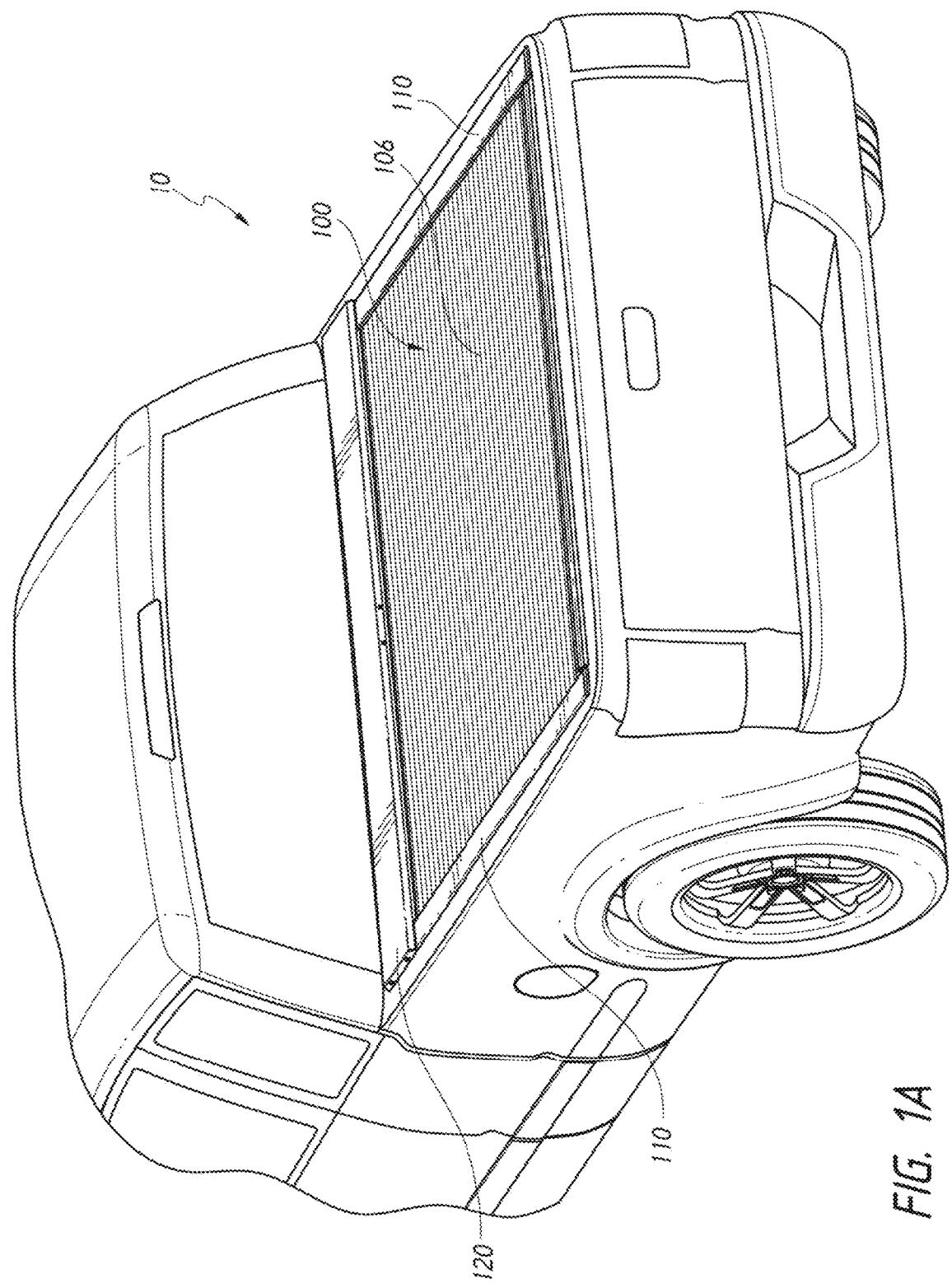
FIG. 1A illustrates an embodiment of a retractable tonneau cover on a vehicle in an extended position.
Figure 1B:
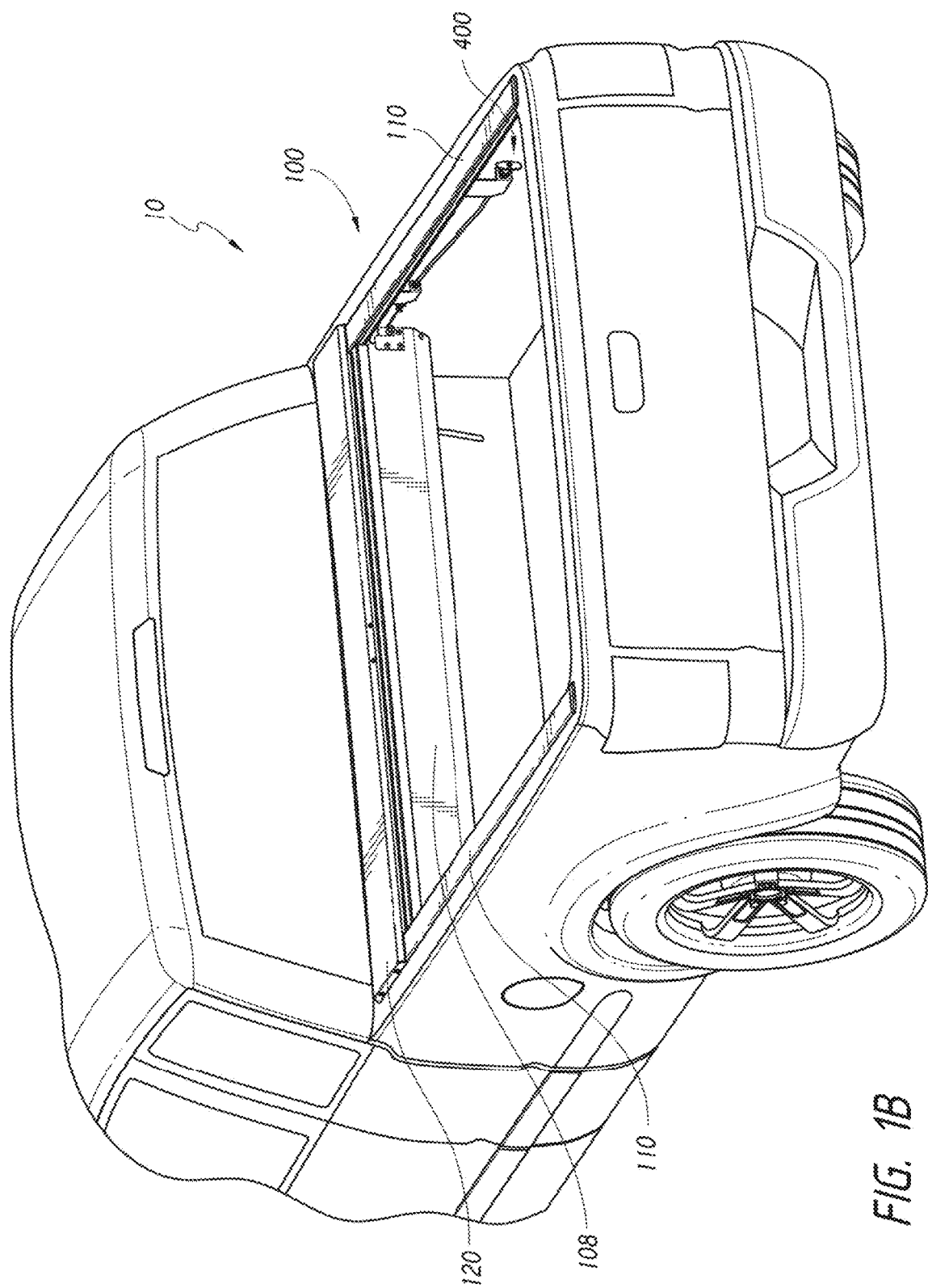
FIG. 1B illustrates an embodiment of a retractable tonneau cover on a vehicle in a retracted position.

FIG. 1A illustrates an embodiment of a tonneau cover 100 on a vehicle 10 in an extended position, thereby covering the cargo bed (or truck bed), where FIG. 1B illustrates an embodiment of the tonneau cover 100 on a vehicle 10 in a retracted position, thereby exposing the cargo bed.

Figure 2:
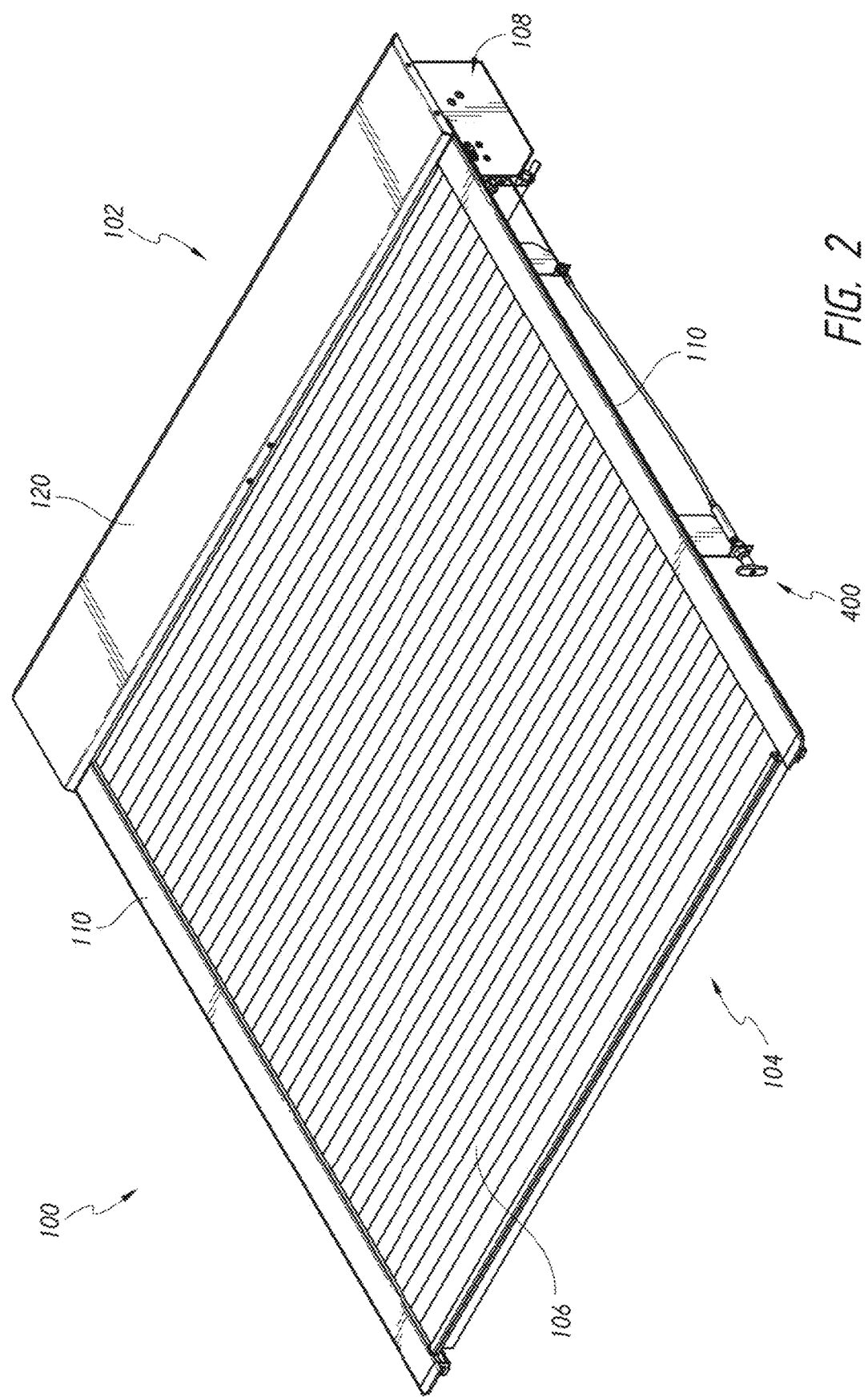
FIG. 2 illustrates a perspective view of a retractable tonneau cover.
Figure 3:
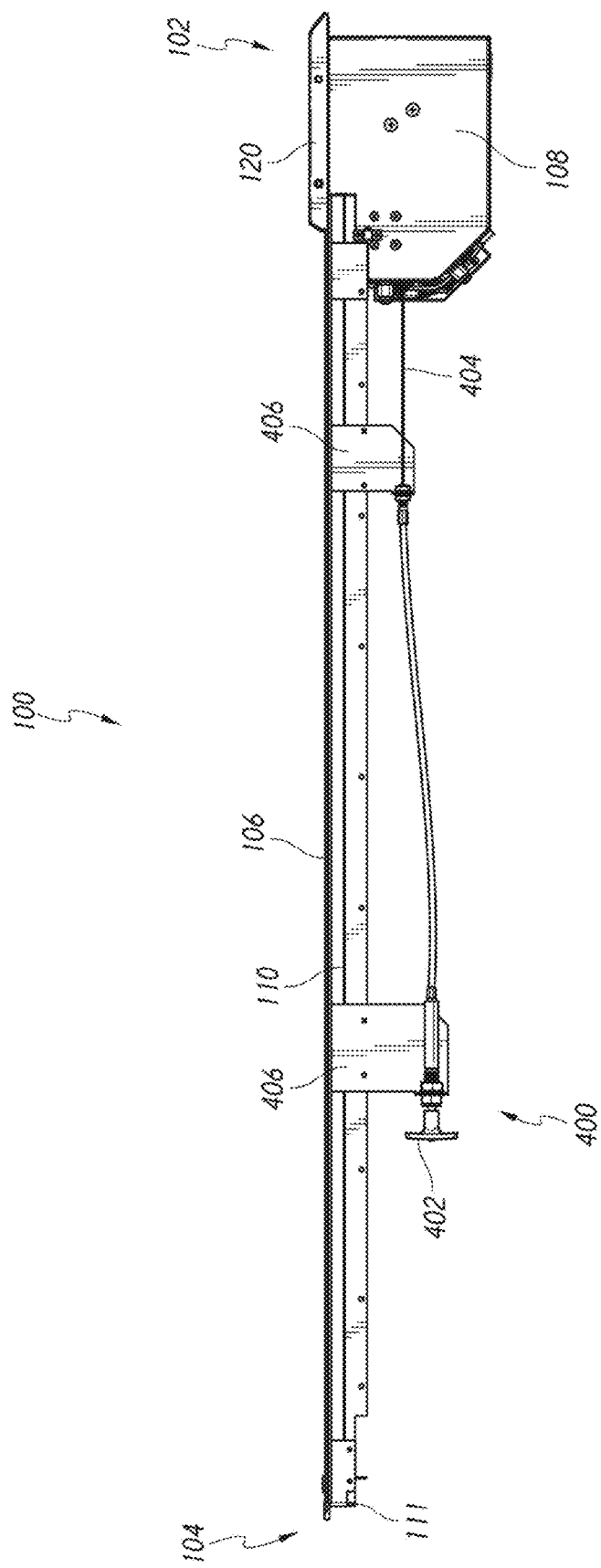
FIG. 3 illustrates a side view of a retractable tonneau cover.

FIG. 2 shows an embodiment of a tonneau cover 100 in a fully extended position from a perspective view, and FIG. 3 shows the tonneau cover 100 from a side view. While a vehicle 10 has been removed, it would be understood that the tonneau cover 100 could be used to cover all or a portion of a vehicle, such as a cargo bed of a truck. This tonneau cover 100 can be incorporated into other vehicles as well, and the particular vehicle type does not limit the disclosure.

As shown, the tonneau cover 100 can be formed from a number of connected slats 106 that can be translated into a housing 108 near the cab end 102 (the retracted position), thus allowing a user to access a the cargo bed of the vehicle 10, and can be translated out to the tailgate end 104 to cover the cargo bed of the vehicle 10 (the extended position), thus preventing access into the cargo bed. The slats 106 can be resilient, thus making the tonneau cover 100 a hard tonneau cover. Each of the slats 106 can extend between two side rails (or tracks) 110 and follow along a slot in the side rails 110 to extend across a width of the cargo bed. Thus, the slats 106 can slide within the side rails 110 between the retracted and extended positions of the tonneau cover 100. The side rails 110 can be attached to the vehicle, such as on the cargo bed, to allow the tonneau cover to properly cover the cargo bed. They can be attached by screws, bolts, rivets, adhesives, etc. and the particular attachment does not limit the disclosure. The side rails 110 can extend along a length of the cargo bed.

Accordingly, in the extended position the tonneau cover 100 can extend between the cab and the tailgate of a vehicle 10, and across the width of the cargo bed, and can completely prevent access to the cargo bed of the vehicle 10. In some embodiments, the tonneau cover 100 can include a lock at the tailgate end 104 which can attach the tonneau cover 100 to a tailgate.

In some embodiments, the slats 106 can be metallic slats (e.g., aluminum, steel, alloy), though the particular metal does not limit the disclosure. The plurality of slats 106 can be flexibly connected to one another allowing for some bending between adjacent slats 106. In some embodiments, a hinge 107 may be used to attach adjacent slats 106 (shown in FIG. 4A). In some embodiments, a living hinge may be used. In some embodiments, a silicon living hinge can be used.

In some embodiments, the slats 106 may be covered by another material, such as vinyl. However, in some embodiments the slats do not contain another material and can be exposed. In some embodiments, the slats 106 are not covered by vinyl. Exposed slats 106 can be advantageous as covering material, such as vinyl, can crease/bunch when the tonneau cover 100 is moving between the extended and the retracted position, stopping movement of the tonneau cover 100 and requiring user maintenance.

Figure 4A:
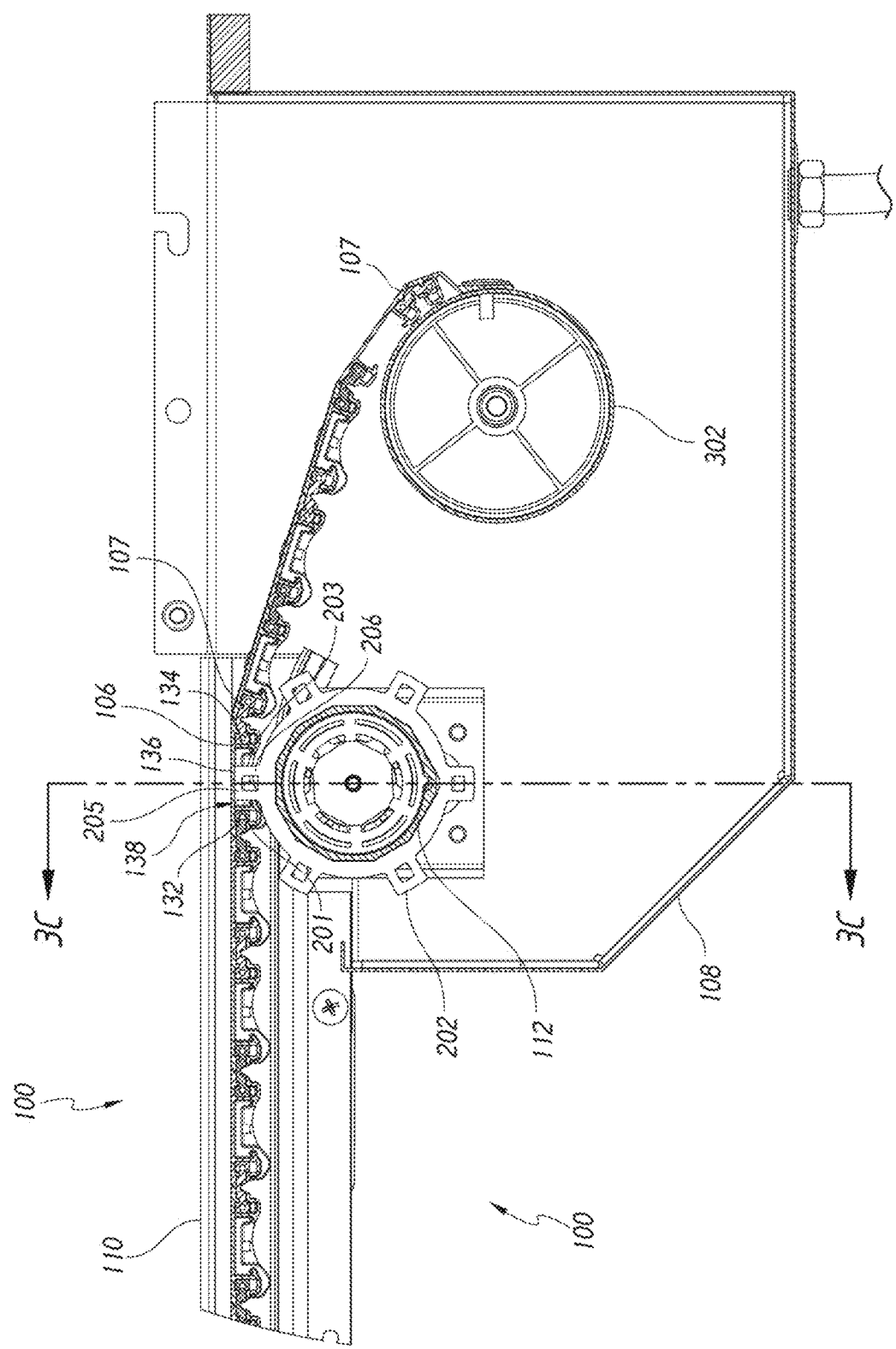
FIGS. 4A-C illustrate a side view of a retractable tonneau cover with outer housing components removed.
Figure 4B:
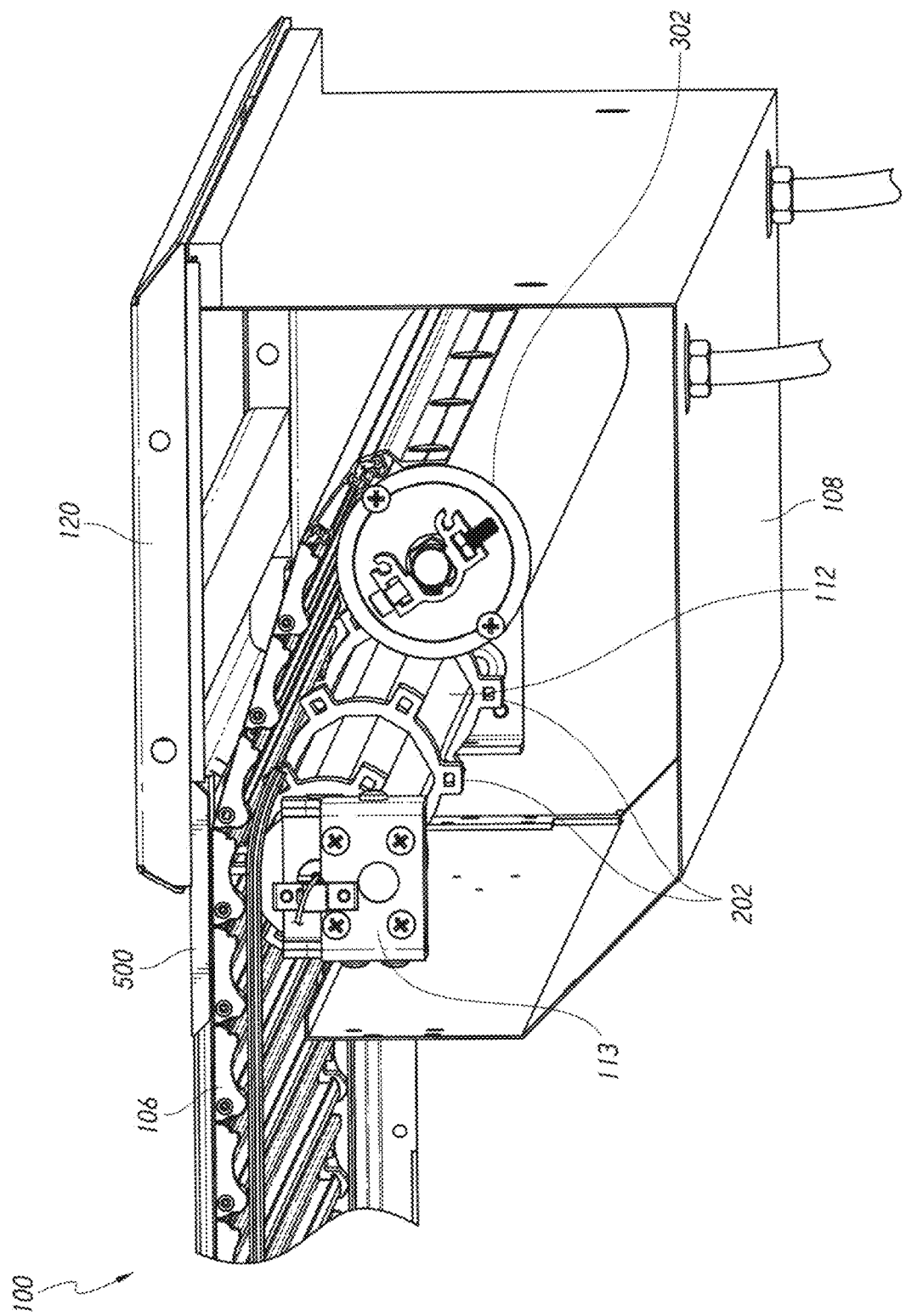
Figure 4C:
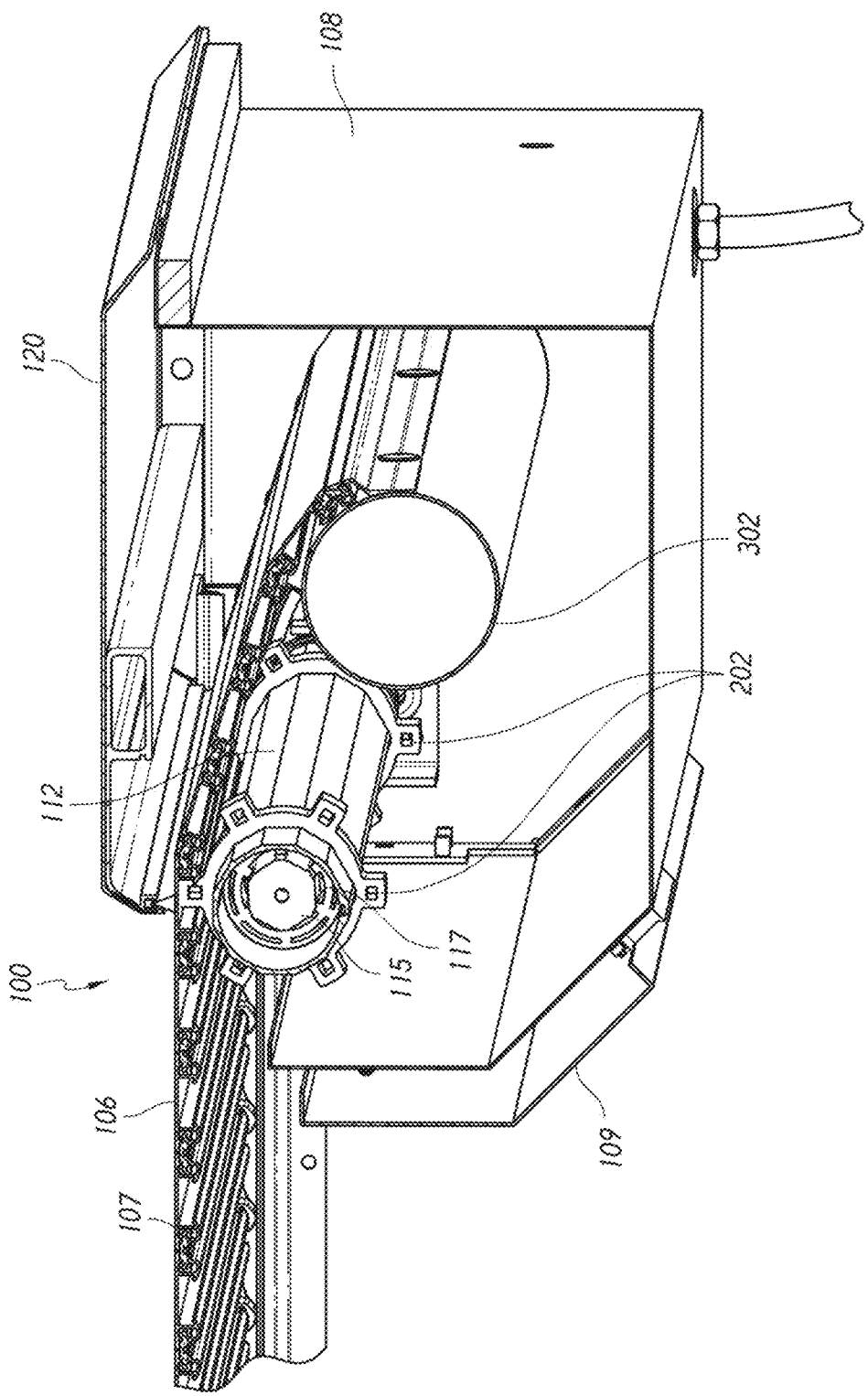

FIGS. 4A-C illustrate a side view of the tonneau cover 100 with a portion of the housing 108 partially removed to better describe the internal components held within the housing 108. As shown, an outer surface of a circular drive cog 202, in particular protrusion 206, interacts with an underside surface of the slats 106 of the tonneau cover 100. In some embodiments, each of the slats 106 can include a first end wall 132 spaced from a second end wall 134 by a connecting wall 136 to define a slot 138 for receiving a portion of the circular drive cog 202, in particular the protrusion 206 of the cog 202. As shown in FIG. 4A, a first surface 201 of the protrusion 206 of the cog 202 can apply a force against the first end wall 132 when rotating counterclockwise to drive the tonneau cover 100 towards the extended position. If used to retract the tonneau cover 100, the second surface 203 of the protrusion 206 can apply a force on the second end wall 134 when rotating clockwise in FIG. 4A to retract the tonneau cover 100. The top surface 205 of the protrusion 206 can abut against the connecting wall 136. Thus, as the circular drive cog 202 turns, the slats 106 would translate along the side rails 110, into and out of the housing 108. In some embodiments, the slot 138 can be larger than the circular drive cog 202 portion, and thus there is some area for the protrusion 206 to move within the slot 138. In some embodiments, not every slat 106 contains a slot 138, which may allow for larger sided cogs to be used.

As shown in FIGS. 4B-C, the circular drive cog 202 can surround a motor drive reel (or motor reel, drive reel) 112 on an internal surface, which in turn houses a motor 115 (or motor drive), such as a tubular motor. Thus, the motor 115 can rotate motor coupler 117 within the motor drive reel 112, and the coupler 117 can engage or disengage with the motor drive reel 112 and or the motor 115 can engage or disengage with the coupler 117. The motor drive reel 112 can extend a width of the housing 108 and be attached to the housing 108, such as through brackets 113. The circular drive cog 202 can fit on the motor drive reel 112 so that as the motor drive reel 112 rotates by rotation of the motor 115, the circular drive cog 202 would rotate as well, thereby translating the tonneau cover 100 as discussed above.

In some embodiments, the motor drive reel 112 is configured to be powered in only one direction. For example, it can be configured to push the tonneau cover 100 from the retracted to the extended position by rotating counterclockwise in the view of FIG. 4A. In some embodiments, the motor drive reel 112 can operate in both directions to open and close the tonneau cover 100 such as in a clockwise and counterclockwise as shown in FIG. 4A.

In some embodiments, two circular drive cogs 202 can be used, each attached on opposite ends of the motor drive reel 112. In some embodiments, three circular drive cogs 202 can be used, each attached on opposite ends of the motor drive reel 112 and one generally in the middle. A clear view of the three cogs 202 can be seen in FIG. 6 and FIG. 7B. The same motor 115 and motor drive reel 112 can rotate the cogs 102 simultaneously. In some embodiments, two motors and/or two motor drive reels can be used to drive the circular cogs 102 separately.

Continuing, the cab end 102 of the tonneau cover 110 can be attached to a spring reel 302, containing a spring, also contained within the housing 108. The spring reel 302 can generally extend the width of the tonneau cover 100 and can be contained within the housing 108. The spring reel 302 can be attached to different sides of the housing 108 at opposite ends of the spring reel 302, such as through brackets. The slats 106 of tonneau cover 100 can wrap around (e.g., roll up on) the spring reel 302 as the tonneau cover 100 is retracted into the housing 108. In some embodiments, the cab end 102 of the tonneau cover 100 can be attached, such as riveted, screwed, bolted, to an outer surface of the spring reel 302. In some embodiments, the tonneau cover 100 may have at one or more slats 106 that are curved 107 to match an outer surface of the spring reel 302.

The spring reel 302 may contain a spring, such as a torsion spring, though the type of spring does not limit the disclosure. The spring is configured to provide a force on the tonneau cover 100 in the direction of retracting the tonneau cover 100 towards the spring reel 302. Thus, in order to retract the tonneau cover 100, the motor 115 can be disengaged from the motor reel 112, allowing the motor reel 112 and circular drive cog 202 to freely spin. The tension of the spring in the spring reel 302 will automatically retract the tonneau cover 100 into the housing 108 until the motor 115 is reengaged with the motor reel 112. Thus, the motor 115 may not exert any force when the tonneau cover 100 is retracting, making the tonneau cover 100 in "a free pull mode". Accordingly, the tonneau cover 100 can be considered spring loaded. When a user wants to extend the tonneau cover 100, the motor 115 can be reengaged and used to push out the tonneau cover 100 into the extended position.

In some embodiments, a spring may not be used and thus the motor 115 can operate the tonneau cover 100 in both directions. In some embodiments, the spring may exert an extending force on the tonneau cover 100 instead of the retracting force discussed above, and the motor 115 may be used to retract the tonneau cover 100. The particular force directionality does not limit the disclosure.

The spring reel 302 can have a diameter of about 1, 1.5, 2, 2.5, 3, 3.5, or 4 inches. The spring reel 302 can have a diameter of greater than about 1, 1.5, 2, 2.5, 3, 3.5, or 4 inches. The spring reel 302 can have a diameter of less than about 1, 1.5, 2, 2.5, 3, 3.5, or 4 inches. The particular dimensions of the spring reel 302 do not limit the disclosure.

In some embodiments, the tonneau cover 100 can be locked at a particular position, such as by engaging the motor 115 with the motor reel 112 but not moving the motor 115 forward. This will allow the tonneau cover 100 to remain in an intermediate position between the retracted and extended position as long as a user desires.

Figure 5:
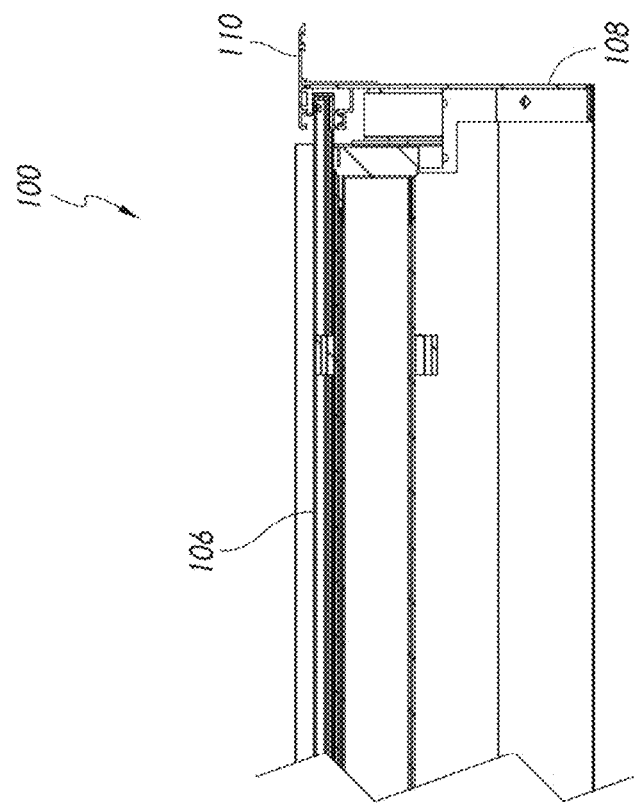
FIG. 5 illustrates a front-on view of a retractable tonneau cover.
Figure 6:
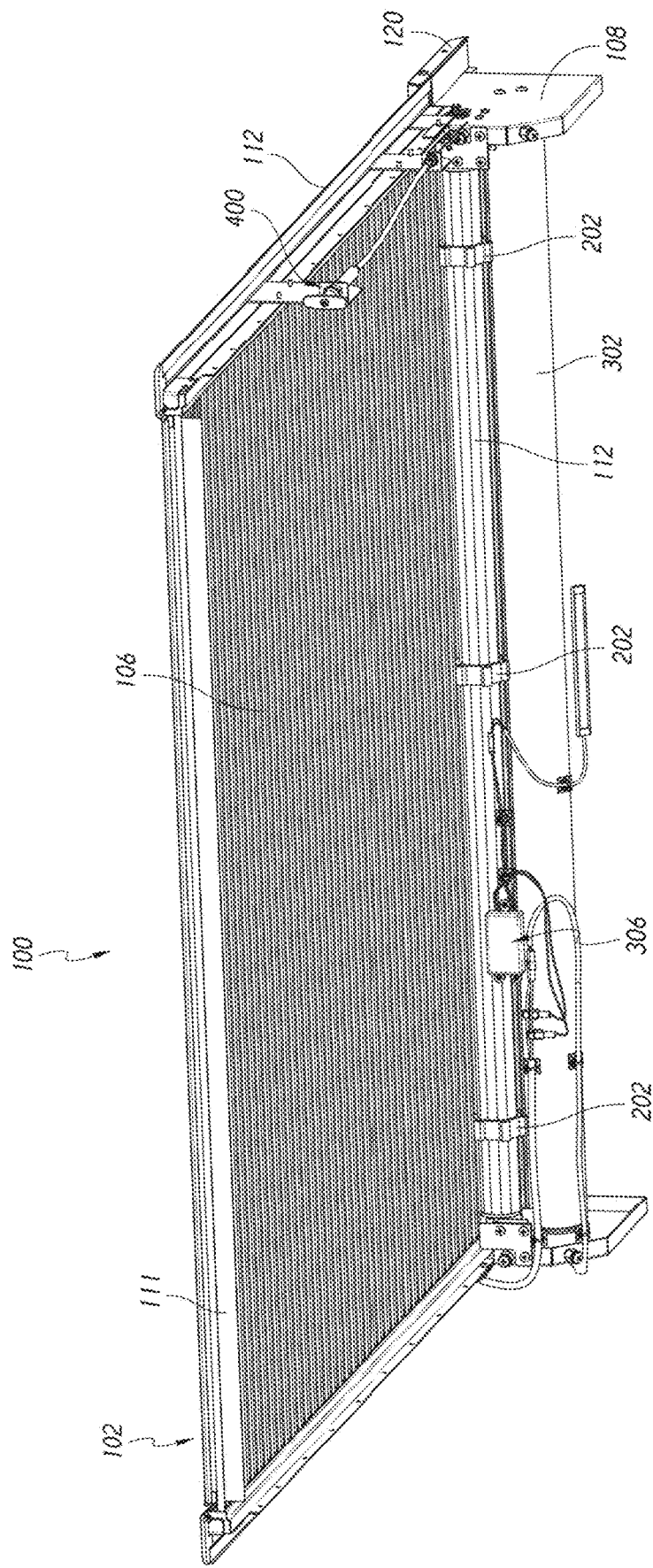
FIG. 6 illustrates a view of a bottom perspective view of a retractable tonneau cover.

FIG. 5 illustrates a front view of the retractable tonneau cover 100 and FIG. 6 shows a perspective underside view of the retractable tonneau cover 100 to more clearly illustrate certain components.

Referring back to FIG. 3, the retractable tonneau cover 100 can have an emergency release 400 which can be incorporated into some embodiments of a tonneau cover 100. In some embodiments, the tonneau cover 100 may not have an emergency release.

As shown, the emergency release 400 can include a handle 402 attached to a cable/wire/cord 404. The cord 404 can be attached into the motor drive reel 112. By activating the emergency release 400, such as pulling/turning/activating the handle 402, the cord 404 can disengage a spring loaded mechanism in the motor 115, such as a release pin compression spring, releasing it from the motor drive reel 112. Thus, when the emergency release 400 is activated, the motor 115 disengages (or separates) from the motor reel 112/circular drive cog 202 and can only spin in place. Accordingly, even if the motor 115 continues to turn, it will not move the tonneau cover 100. The emergency release 400 can be connected to the side rail 110 by one or more holders 406 extending downwards from the side rails 110. The emergency release 400 can be bolted, or otherwise connected to the holders 406. In some embodiments, the holders 406 can be thin sheet metal, hooks, etc. In some embodiments, the cable 404 can include a covering extending partially along a length of the cable 404. The emergency release 400 can be located within the cargo bed in some embodiments, such as shown in FIG. 1B, and outside the cargo bed in some embodiments. A user can further deactivate the emergency release 400 when desired to reengage the motor 115.

FIGS. 7A-B illustrate a reverse perspective of the retractable tonneau cover 110 with the back portion of the housing 108 removed, which allows viewing of electronic components 306. FIG. 7B also removes the spring reel 302 for convenience. Specifically, a lid 120 on the top side of the tonneau cover 100 on the cab end 102 can be seen. The lid 120 may be one single piece covering the housing 108 and allowing the tonneau cover 100 to pass under the lid 120 and into the housing 108. The lid 120 can lie on the rails 110 and thus can span a width of the tonneau cover 110.

Previously, electronic components 306 for operating the motor 115 were stored within the lid 120, such as on a tray that is not used in this embodiment. This can create a large and bulky lid 120, which is aesthetically unappealing. Accordingly, embodiments of the disclosure have moved/integrated the electronic components 306 from the lid 120 into/with the housing 108 and/or into the motor drive reel 112. This allows for the lid 120 to be much more compact, both vertically and horizontally, and more aesthetically pleasing, as well as moving the electronic components 306 under further cover to prevent any damage from the elements.

Thus, in some embodiments the lid 120 can have a height of 0.5, 1, 1.5, 2, 2.5, 3, 3.5, 4, 4.5, or 5 inches. In some embodiments, the lid 120 can have a height of greater than 0.5, 1, 1.5, 2, 2.5, 3, 3.5, 4, 4.5, or 5 inches. In some embodiments, the lid 120 can have a height of less than 0.5, 1, 1.5, 2, 2.5, 3, 3.5, 4, 4.5, or 5 inches.

In some embodiments, the lid 120 can have a length (the direction from the cab to the tailgate) of 5, 6, 7, 8, 9, 10, 11, or 12 inches. In some embodiments, the lid 120 can have a length (the direction from the cab to the tailgate) of greater than 1, 2, 3, 4, 5, 6, 7, 8, 9, 10, 11, or 12 inches. In some embodiments, the lid 120 can have a length (the direction from the cab to the tailgate) of less than 5, 6, 7, 8, 9, 10, 11, or 12 inches. This can be approximately ½, ⅓, or ¼ smaller of a length than previous retractable tonneau covers. In some embodiments, it can be greater than ½, ⅓, or ¼ smaller of a length than previous retractable tonneau covers. In some embodiments, it can be less than ½, ⅓, or ¼ smaller of a length than previous retractable tonneau covers.

As shown in FIGS. 7A-B, the electronic components 306 have been moved within the housing 108 and can be integrated more closely with the motor drive reel 112. This allows the electronic components 306 to be moved from the lid 120, thereby reducing the size of the lid 120. In some embodiments, the electronic components 306 may connect the motor 115 to electronics within the vehicle 10. In some embodiments, the electronic components 306 may include a battery. The electronic components 306 can include wires connecting the motor 115 to an activation source, which can receive a signal (wireless, Bluetooth, RF, etc.) from a user to operate the motor 115, and thus the tonneau cover 100. The electronic components 306 may be generally contained within a container in the housing 108 and/or motor drive reel 112, or may be free within them.

In some embodiments, the tonneau cover 100 can include a stopper 111 (or stop mechanism, tab) on its tailgate end 104. The stopper 111 can be seen in FIG. 6 among others. The stopper 111 can extend generally downwards from the tailgate end 104. As the tonneau cover 100 is withdrawn through tension of the spring reel 302, the tonneau cover 100 would be completely withdrawn into the housing 108 if left on its own. This would release the tonneau cover 100 from the circular drive cog 202, thereby making the tonneau cover 100 inoperable. Accordingly, it can be advantageous to include the stopper 111 for preventing the tonneau cover 100 from fully entering the housing 108. As the tonneau cover 100 is retracted, the stopper 111 will abut the housing 108 or cargo bumper, preventing any further retraction of the tonneau cover 100 into the housing 108.

The stopper 111 can extend partially or fully along the width of the final slat in the tonneau cover 100. In some embodiments, a plurality of stoppers can be used, adjacent stoppers being spaced apart from one another. In some embodiments, 1, 2, 3, 4, or 5 stoppers can be used. In some embodiments, greater than 1, 2, 3, 4, or 5 stoppers can be used. In some embodiments, less than 2, 3, 4, or 5 stoppers can be used.

The stopper 111 can extend downwards from the slats 106 approximately 0.5, 1, 1.5, 2, 2.5, or 3 inches. The stopper 111 can extend downwards from the slats 106 greater than 0.5, 1, 1.5, 2, 2.5, or 3 inches. The stopper 111 can extend downwards from the slats 106 less than 1, 1.5, 2, 2.5, or 3 inches. In some embodiments, the stopper 111 can be ¹⁄₁₀, ⅛, ⅙, ¼, or ½ inches in thickness. In some embodiments, the stopper 111 can be greater than ¹⁄₁₀, ⅛, ⅙, ¼, or ½ inches in thickness. In some embodiments, the stopper 111 can be less than ¹⁄₁₀, ⅛, ⅙, ¼, or ½ inches in thickness. The particular size of the stopper does not limit the disclosure, and the stopper 111 can be generally sized to abut against a front surface of the housing 108 or the cargo bumper.

While the stopper 111 can be advantageously used to prevent unwanted retraction of the tonneau cover 100 into the housing 108, it can also be used for the initial setting of the motion of the tonneau cover 100. Embodiments of the disclosed tonneau cover 100 can be used for many different lengths of cargo beds. Thus, the stopper 111 can be used to set the retraction/extension limit of the tonneau cover 100 when first installed. The tonneau cover 100 can be installed onto a vehicle and operating in setting to properly extend/retract the tonneau cover 100. For example, the tonneau cover 100 can be pulled into the fully extended position and run until the stopper 111 hits the housing, stopping retraction of the tonneau cover 100. This setting can be saved into the system, thus allowing for the tonneau cover 100 to extend and retract to the proper dimensions. In some embodiments, the housing 108 can include a cargo bumper 109 attached facing into the cargo bed, such as towards the tailgate, shown in FIG. 4C. This bumper 109 can be formed to accept impacts, such as the stopper 111 or cargo in the cargo bed, thus reducing or eliminating damage the housing 108 and/or any internal components.

Figure 8C:
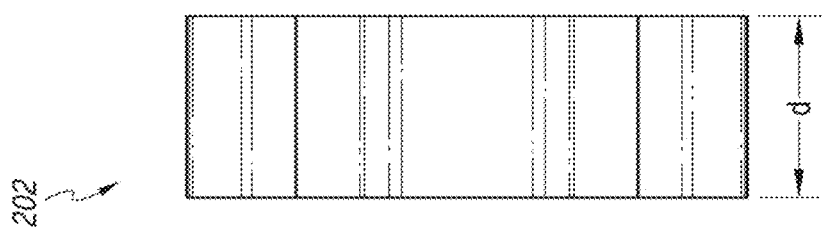
FIGS. 8A-C illustrate views of a toothed cog that can be used with the retractable tonneau cover.
Figure 8B:
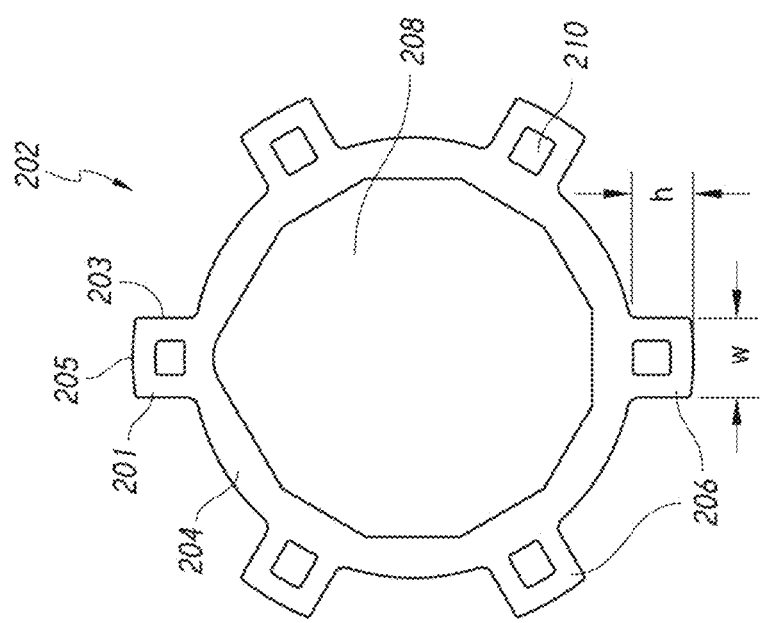
Figure 8A:
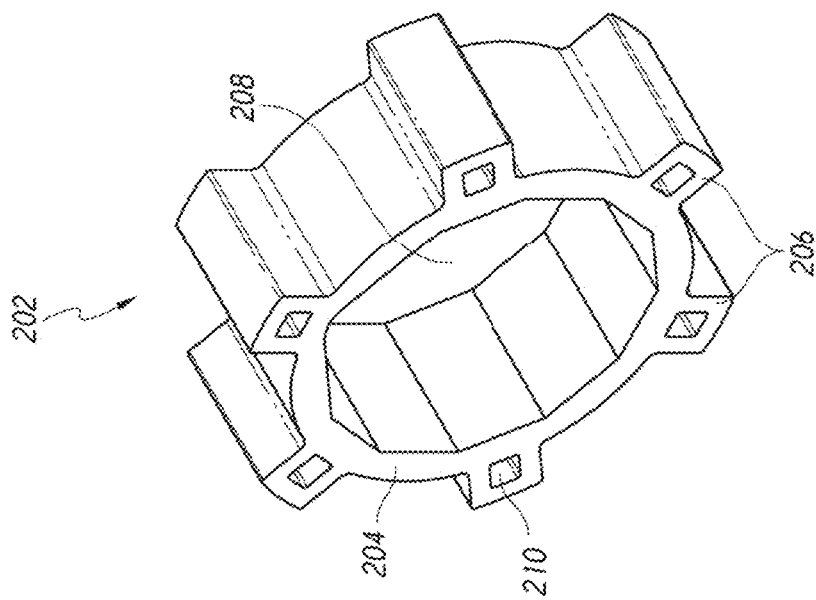

FIGS. 8A-C illustrate an embodiment of a circular drive cog 202 that can be used to retract and extend the tonneau cover 100. This circular drive cog 202 can be generally smaller than cogs typically used for a retractable tonneau cover, as well as having more teeth and smaller teeth. As shown, the circular drive cog 202 can contain a generally circular body 204 with a number of protrusions (or teeth) 206 extending outwards from the body 204. Each of the protrusions 206 can have a first surface 201, a second surface 203 opposite the first surface, and a top surface 205 connecting the first surface 201 and the second surface 203. The circular drive cog 202 can contain 4, 5, 6, 7, 8, 9, or 10 protrusions. The circular drive cog 202 can contain greater than 4, 5, 6, 7, 8, 9, or 10 protrusions in some embodiments. In some embodiments, the protrusions 206 are equally spaced around the body 204. In some embodiments, the protrusions 206 are spaced around the body 204 unequally. The circular drive cog 202 can contain less than 4, 5, 6, 7, 8, 9, or 10 protrusions in some embodiments. As shown, the body 204 can have an aperture 208 extending through the center, forming the body 204 into a ring shape. The aperture 208 can be sized to fit around the motor drive reel 112 so that the circular drive cog 202 rotates with the motor drive reel 112. Further, the protrusions 206 can each contain an aperture 210 extending through them.

In some embodiments, the radius of the circular drive cog 202 can be between 1 and 2 inches (or between about 1 and about 2 inches). In some embodiments, the radius of the circular drive cog 202 can be greater than 1, 1.1, 1.2, 1.3, 1.4, 1.5, 1.6, 1.6, 1.8, 1.9, or 2.0 inches. In some embodiments, the radius of the circular drive cog 202 can be less than 1, 1.1, 1.2, 1.3, 1.4, 1.5, 1.6, 1.6, 1.8, 1.9, or 2.0 inches. In some embodiments, the circular drive cog 202 can have a depth (shown in FIG. 8B) of between 0.5 and 2 inches (or between about 0.5 and about 2 inches). In some embodiments, the circular drive cog 202 can have a depth "d" (shown in FIG. 8C) of greater than 0.5, 1.0, 1.5, or 2.0 inches. In some embodiments, the circular drive cog 202 can have a width of less than 0.5, 1.0, 1.5, or 2.0 inches.

In some embodiments, the circular drive cog 202 can have a diameter of approximately 1, 1.5, or 2 inches. In some embodiments, the circular drive cog 202 can have a diameter of less than approximately 1.5 or 2 inches. In some embodiments, the circular drive cog 202 can have a diameter of greater than 1, 1.5, or 2 inches. The diameter of the drive cog 202 is the diameter across the internal surface of the body 204 (from inside surface to opposite inside surface), which is also the diameter of the aperture 208. This is smaller than previous cogs, which were approximately 2.5 inches in diameter or greater. In some embodiments, the diameter of the cog 202 from the outer surface of a protrusion 206 to the outer surface of an opposite protrusion 206 may be about 3, 3 and ⅛, 3 and ¼, or 3 and ½ inches. In some embodiments, the diameter of the cog 202 from the outer surface of a protrusion 206 to the outer surface of an opposite protrusion 206 may be greater than about 3, 3 and ⅛, 3 and ¼, or 3 and ½ inches. In some embodiments, the diameter of the cog 202 from the outer surface of a protrusion 206 to the outer surface of an opposite protrusion 206 may be less than about 3, 3 and ⅛, 3 and ¼, or 3 and ½ inches.

In some embodiments, the protrusions 206 can have a width "w" (shown in FIG. 8B) of between 0.25 and 0.75 inches (or between about 0.25 and about 0.75 inches). In some embodiments, the protrusions 206 can have a width of greater than 0.25, 0.5, or 0.75 inches. In some embodiments, the protrusions 206 can have a width of less than 0.25, 0.5, or 0.75 inches. In some embodiments, the protrusions 206 can have a height "h" (shown in FIG. 8B) of between 0.25 and 0.75 inches (or between about 0.25 and about 0.75 inches). In some embodiments, the protrusions 206 can have a height of greater than 0.25, 0.5, or 0.75 inches. In some embodiments, the protrusions 206 can have a height of less than 0.25, 0.5, or 0.75 inches. In some embodiments, the protrusions 206 can have a generally square cross section when viewed from the width v. height plane, such as shown in FIG. 8B. In some embodiments, the protrusions 206 can have a generally rectangular cross section. The particular cross section shape does not limit the disclosure.

As discussed above, the protrusions 206 of the circular drive cog 202 can be generally sized and configured to fit into the underside of the slats of the tonneau cover 100. Thus, rotation of the circular drive cog 202 causes the tonneau cover 100 to linearly translate between the retracted and extended positions. As the circular drive cog 202 can provide an upward force onto the tonneau cover 100, there is the potential that the tonneau cover 100 could jump the circular drive cog 202. Further, the circular drive cog 202 can potentially push the tonneau cover 100 into the underside of the lid 120. Accordingly, embodiments of the disclosure can include engagement 500 pads which can prevent/limit the vertical movement of the tonneau cover 100, thus avoiding the tonneau cover 100 inappropriately moving or stopping.

FIGS. 9A-C illustrate an embodiment of such an engagement pad 500, with FIG. 4B illustrating its position on the tonneau cover 100. FIG. 9A illustrates a side view of the pad 500, such as shown in FIG. 4B. FIG. 9B illustrates a top view and FIG. 9C illustrates a bottom view. As shown, the engagement pad 500 can have an outward facing surface 502, an inward facing surface 504, a bottom surface 506, and an upper surface 508.

As shown, the upper surface 508 can include a number of indents 510 which can be used to connect the engagement pad 500 to the side rail 110, such as by mating with protrusions in the side rail 110, and prevent unwanted motion of the engagement pad 500. In some embodiments, 1, 2, 3, 4, 5, or 6 indents 510 can be used, though the particular location and number of indents does not limit the disclosure. Further, the bottom surface 506 and upper surface 508 can include an aperture 512 for extending a bolt through the engagement pad 500 to attach to the side rail 110. The bottom surface 506 can include a larger aperture than the top surface 508 in order to retain the head of a bolt. In some embodiments, the engagement pad 500 can alternatively be screwed, adhered, or otherwise connect to the rail 110, and the aperture 512 may not be used in some embodiments. In some embodiments, the bottom surface 506 is flat other than the aperture 512 in order to engage with the slats 106. The bottom surface 506 can be depressed or deformed by the slats 106 during operation.

Further, the inward facing surface 504 can include a step 514. This step 514 can be configured so that a portion of the side rail 110 can rest on the step 514

In some embodiments, the engagement pad 500 can be made of plastic, metal, or rubber. In some embodiments, the engagement pad 500 can be injected molded, though the particular processing methodology does not limit the disclosure.

In some embodiments, the engagement pad 500 can be approximately 3 inches by 0.5 inches by ¼ inches. As shown, the engagement pad 500 can have a trapezoidal look when viewed from the side, the bottom being narrower than the top. Thus, both sides of the engagement pad 500 can be inclined. The engagement pad 500 can be keyed into the side rail 110. Thus, there can be two engagement pads, one on each side of the width of the tonneau cover 100. More engagement pads can be used along the length of the side rails 110. The engagement pad 500 can put downward pressure onto an upper surface of the tonneau cover 100, thereby preventing unwanted motion. Specifically, the engagement pad 500 can hold down the tonneau cover 100 and prevent it from "jumping" off of the cogs 202.

Figure 10:
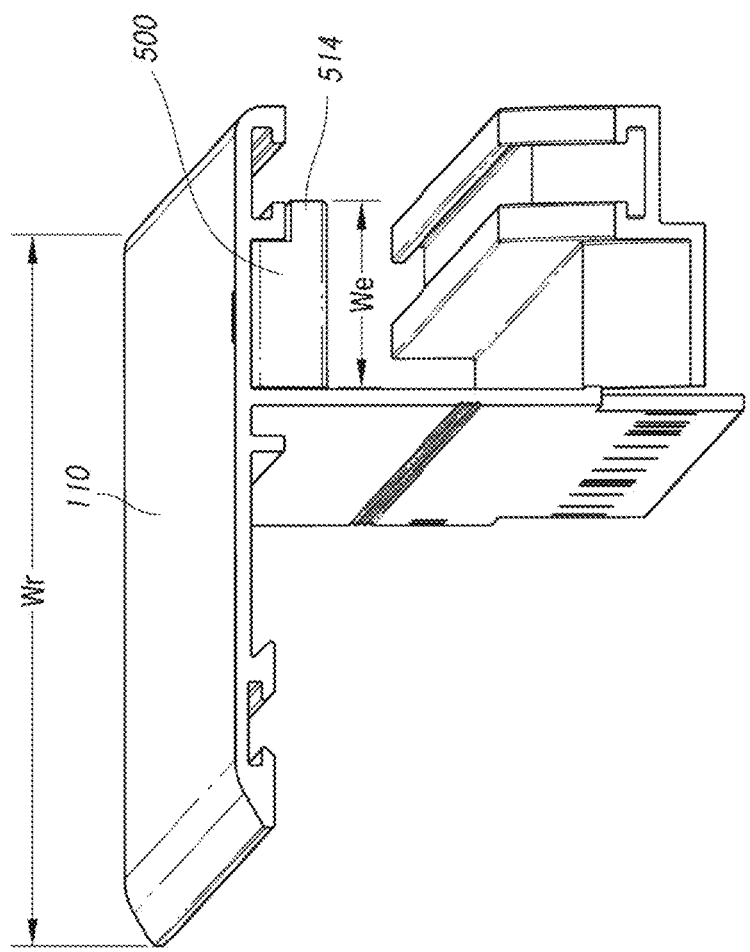
FIG. 10 illustrates an engagement pad in connection with a side rail of a retractable tonneau cover.
Figure 11:
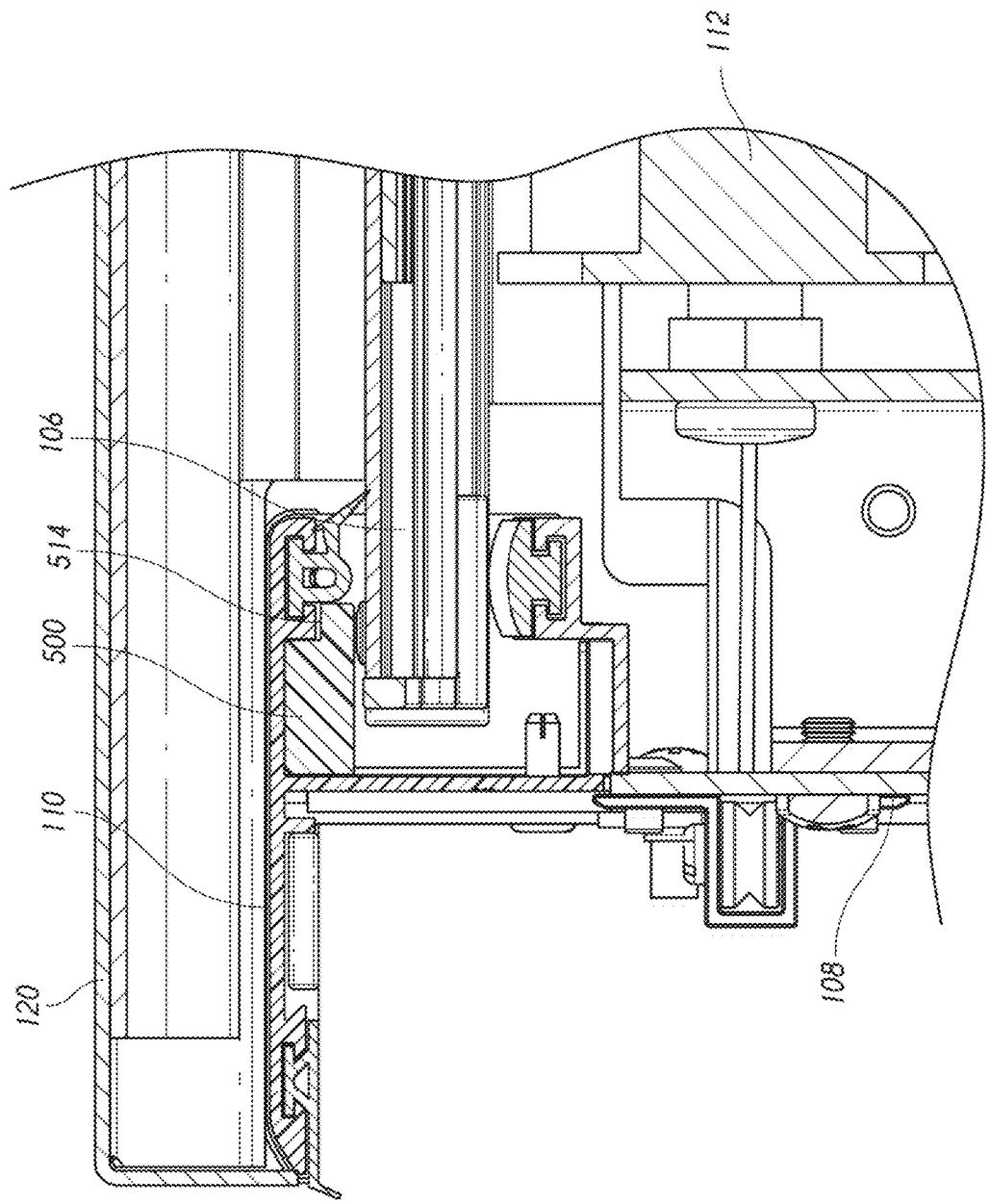
FIG. 11 illustrates a cross section view of a replacement tonneau cover.

FIG. 10 illustrates a side rail 110 and an engagement pad 500 connected to the side rail 110. In some embodiments, the width of the engagement pad 500 (We) can be ⅛, ¼, ½, ¾, equal to, 1 and ¼, 1 and ½, 1 and ¾, 2, 2 and ½, 3, or 4 times with width of the side rail 110 (Wr). In some embodiments, the width of the engagement pad 500 (We) can be less than ⅛, ¼, ½, ¾, equal to, 1 and ¼, 1 and ½, 1 and ¾, 2, 2 and ½, 3, or 4 times with width of the side rail 110 (Wr). In some embodiments, the width of the engagement pad 500 (We) can be greater than ⅛, ¼, ½, ¾, equal to, 1 and ¼, 1 and ½, 1 and ¾, 2, 2 and ½, 3, or 4 times with width of the side rail 110 (Wr). FIG. 11 illustrates a cross section view when viewed toward the tailgate end 104, which shows the positioning of the engagement pad 500 with respect to other components in the tonneau cover 100. In some embodiments, the engagement pads 500 are only positioned along the respective side rails 110, the engagement pads extend no more than ½, 1, 1½ or 2 times the width of the rail 110 and there is only one engagement pad 500 per rail 110.

Embodiments of the tonneau cover 100 can be activated by a user to extend between a retracted and extended position. For example, a user can activate a key fob 600 to operate the motor 115 of the tonneau cover 100, thereby moving it between an extended and retracted position. The key fob 600 can use Bluetooth connection, wireless connection, radiofrequency connection, or any other connection to operate the motor 115. Further, the key fob 600 may be able to stop the tonneau cover 100 at a particular position on the truck bed, e.g., at a partially retracted/partially extended position. In some embodiments, the tonneau cover 100 may be operated by another approach, such as through a smartphone app, a button/switch on the vehicle, a button/switch on the tonneau cover, etc. and the particular device for operating the tonneau cover 100 does not limit the disclosure.

From the foregoing description, it will be appreciated that an inventive retractable tonneau cover is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A retractable tonneau cover system configured for use with a vehicle, the retractable tonneau cover system comprising:
    a pair of side rails, each of the pair of side rails configured to be secured to a portion of a cargo bed of the vehicle;
    a plurality of slats coupled to one another and configured to extend between the pair of side rails, wherein each of opposing ends of each of the plurality of slats are configured to be received by a portion of one of the pair of side rails;
    a housing configured to be positioned near a cab end of the cargo bed of the vehicle when the retractable tonneau cover system is installed, wherein the cab end of the vehicle is positioned opposite a tailgate end of the vehicle;
    a motor drive reel positioned at least partially within the housing;
    a motor positioned at least partially within the motor drive reel and configured to cause rotation of the motor drive reel;
    one or more drive cogs coupled with the motor drive reel, wherein, upon rotation of the motor drive reel, the one or more drive cogs are configured to engage one or more of the plurality of slats to move the plurality of slats with respect to the pair of side rails between an extended position and a retracted position; and
    a key fob configured to wirelessly communicate with the motor to cause rotation of the motor drive reel and the one or more drive cogs coupled with the motor drive reel to move the plurality of slats between the extended position and the retracted position, wherein the key fob is further configured to wirelessly communicate with the motor to stop said rotation of the motor drive reel and the one or more drive cogs coupled with the motor drive reel and to stop movement of the plurality of slats at any one of a plurality of intermediate positions between said extended and retracted positions.

2. The retractable tonneau cover system of claim 1, further comprising a motor coupler positioned within and coupled to the motor drive reel, wherein the motor is configured to cause rotation of the motor drive reel via the motor coupler.

3. The retractable tonneau cover system of claim 2, wherein:
    the motor is configured to engage or disengage with the motor coupler; and/or
    the motor coupler is configured to engage or disengage with the motor drive reel.

4. The retractable tonneau cover system of claim 1, further comprising a release mechanism comprising a handle and one of a cable, wire, and cord coupled to the handle, and wherein said one of the cable, wire, and cord is coupled to said motor drive reel and is configured to disengage the motor from the motor drive reel.

5. The retractable tonneau cover system of claim 4, wherein said release mechanism is configured to be connected to one of the pair of side rails.

6. The retractable tonneau cover system of claim 1, wherein said key fob is configured to wirelessly communicate with the motor of the retractable tonneau cover via a Bluetooth® connection.

7. The retractable tonneau cover system of claim 1, wherein said key fob is configured to wirelessly communicate with the motor of the retractable tonneau cover via a radio frequency connection.

8. The retractable tonneau cover system of claim 1, wherein:
    the housing comprises a first side configured to be positioned near the cab end of the cargo bed of the vehicle when the retractable tonneau cover system is installed and a second side opposite the first side; and
    the retractable tonneau cover system further comprises:
        a stopper extending transverse from a portion of the plurality of slats; and
        a cargo bumper connected to the housing, the cargo bumper defining an abutment surface that is spaced from the first side of the housing, wherein the cargo bumper is configured to be positioned farther from the cab end of the vehicle than the housing when the retractable tonneau cover system is installed;
        when the plurality of slats is moved to the retracted position, the stopper contacts the abutment surface of the cargo bumper to prevent an end of the plurality of slats from being moved into the housing.

9. A retractable tonneau cover system configured for use with a vehicle, the retractable tonneau cover system comprising:
    a pair of side rails, each of the pair of side rails configured to be secured to a portion of the vehicle;
    a plurality of slats coupled to one another and configured to extend between the pair of side rails;
    a housing configured to be positioned near a cab end of a cargo bed of the vehicle;
    a motor;
    one or more drive cogs coupled with the motor; and
    a key fob configured to wirelessly communicate with the motor to cause rotation of the one or more drive cogs to move the plurality of slats between an extended position and a retracted position, wherein the key fob is further configured to wirelessly communicate with the motor to stop said rotation of the one or more drive cogs and to stop movement of the plurality of slats at any one of a plurality of intermediate positions between said extended and retracted positions.

10. The retractable tonneau cover system of claim 9, further comprising a motor drive reel positioned at least partially within the housing, wherein the motor is configured to cause rotation of the motor drive reel and wherein, upon rotation of the motor drive reel, the one or more drive cogs are configured to engage one or more of the plurality of slats to move the plurality of slats between the extended position and the retracted position.

11. The retractable tonneau cover system of claim 10, further comprising a motor coupler positioned within and coupled to the motor drive reel, wherein the motor is configured to cause rotation of the motor drive reel via the motor coupler.

12. The retractable tonneau cover system of claim 11, wherein:
    the motor is configured to engage or disengage with the motor coupler; and/or
    the motor coupler is configured to engage or disengage with the motor drive reel.

13. The retractable tonneau cover system of claim 10, further comprising a release mechanism comprising a handle and one of a cable, wire, and cord coupled to the handle, wherein said one of the cable, wire, and cord is configured to disengage the motor from the motor drive reel.

14. The retractable tonneau cover system of claim 9, wherein said key fob is configured to wirelessly communicate with the motor via at least one of a Bluetooth® connection and a radio frequency connection.

15. The retractable tonneau cover system of claim 9, wherein:
    the housing comprises a first side configured to be positioned near the cab end of the cargo bed of the vehicle when the retractable tonneau cover system is installed and a second side opposite the first side; and
    the retractable tonneau cover system further comprises:
        a stopper extending transverse from a portion of the plurality of slats; and
        a cargo bumper connected to the housing, the cargo bumper defining an abutment surface that is spaced from the first side of the housing, wherein the cargo bumper is configured to be positioned farther from the cab end of the vehicle than the housing when the retractable tonneau cover system is installed;
        when the plurality of slats is moved to the retracted position, the stopper contacts the abutment surface of the cargo bumper to prevent an end of the plurality of slats from being moved into the housing.

16. A retractable tonneau cover system configured for use with a vehicle, the retractable tonneau cover system:
    a pair of side rails, each of the pair of side rails configured to be secured to a portion of the vehicle near a cargo bed of the vehicle;
    a plurality of slats coupled to one another and configured to extend between the pair of side rails;
    a stopper extending transverse from a portion of the plurality of slats;
    a housing comprising a first side configured to be positioned near a cab end of the cargo bed of the vehicle when the retractable tonneau cover system is installed and a second side opposite the first side;
    a cargo bumper connected to the housing, the cargo bumper defining an abutment surface that is spaced from the first side of the housing, wherein the cargo bumper is configured to be positioned farther from the cab end of the vehicle than the housing when the retractable tonneau cover system is installed;
    a motor; and
    one or more drive cogs coupled with the motor, wherein the motor is configured to cause the one or more drive cogs to engage one or more of the plurality of slats to move the plurality of slats between an extended position and a retracted position;
    wherein, when the plurality of slats is moved to the retracted position, the stopper contacts the abutment surface of the cargo bumper to prevent an end of the plurality of slats from being moved into the housing.

17. The retractable tonneau cover system of claim 16, wherein the stopper extends downward from one of the plurality of slats at a tailgate end of the plurality of slats.

18. The retractable tonneau cover system of claim 16, wherein the stopper extends downward from and along a full width of one of the plurality of slats.

19. The retractable tonneau cover system of claim 16, wherein the first side of the housing is at least partially defined by two plates angled transverse to one another and wherein the cargo bumper is at least partially defined by two plates angled transverse from one another and offset from the two plates of the first side of the housing.

20. The retractable tonneau cover system of claim 16, further comprising a key fob configured to wirelessly communicate with the motor, wherein the key fob is further configured to:
    wirelessly transmit a first instruction to the motor to cause rotation of the one or more drive cogs to move the plurality of slats to the extended position;
    wirelessly transmit a second instruction to the motor to cause rotation of the one or more drive cogs to move the plurality of slats to the retracted position; and
    wirelessly transmit a third instruction to the motor to cause rotation of the one or more drive cogs to move the plurality of slats to an intermediate position that is between said extended and retracted positions.

* * * * *